(12) United States Patent
Lee

(10) Patent No.: US 7,702,700 B2
(45) Date of Patent: Apr. 20, 2010

(54) AUTOMATIC MATCHING METHOD AND AUTOMATIC MATCHING SYSTEM

(75) Inventor: Hyang Cheol Lee, Yongin-Si (KR)

(73) Assignee: NHN Corporation, Seongnam-Si, Kyunggi-Do (KR)

( * ) Notice: Subject to any disclaimer, the term of this patent is extended or adjusted under 35 U.S.C. 154(b) by 339 days.

(21) Appl. No.: 11/728,820

(22) Filed: Mar. 27, 2007

(65) Prior Publication Data

US 2008/0052277 A1    Feb. 28, 2008

(30) Foreign Application Priority Data

Mar. 29, 2006   (KR) ................ 10-2006-0028327
Mar. 29, 2006   (KR) ................ 10-2006-0028328

(51) Int. Cl.
    *G06F 17/00* (2006.01)
(52) U.S. Cl. ................. 707/826; 707/828
(58) Field of Classification Search ......... 707/821–831
    See application file for complete search history.

(56) References Cited

U.S. PATENT DOCUMENTS 6,704,729 B1    3/2004   Klein et al.

FOREIGN PATENT DOCUMENTS

KR     10-0534493     12/2005

OTHER PUBLICATIONS

Korean Office Action dated May 28, 2007, issued to one of the counterpart Korean patent applications.

*Primary Examiner*—Isaac M Woo
(74) *Attorney, Agent, or Firm*—Knobbe, Martens, Olson & Bear LLP

(57) ABSTRACT

An automatic matching method and system which can initially automatically match a category and an original query, and then perform a search within a designated category when matching a subsequent query, and thereby enable a more accurate query matching is provided. According to the present invention, there is provided an automatic matching method and system which can automatically match a category and an original query prior to matching a query and thereby can more exactly match the query within a designated category.

8 Claims, 17 Drawing Sheets

FIG. 4

```xml
<?xml version="1.0" encoding="euc-kr"?>
- <shoppingadminsearch author="Choi Kyusic" email="kyusic@nhncorp.com"
    phone="1238" version="0.1">
- <section_price>
    <total>2</total>
  - <item docid="75935"similarity="0.177463">
      <nv_mid>112319</nv_mid>
      <cat_id>00070001</cat_id>
      <depth1>ELECTRIC APPLIANCES.MOBILE PHONE</depth1>
      <depth2>MOBILE PHONE/PDA/NAVIGATION</depth2>
      <depth3>MOBILE PHONE</depth3>
      <depth4>K T F</depth4>
      <maker>KTF</maker>
      <brand>KTF EVER</brand>
      <model>KTF-X5500</model>                      ⎯401
      <item>MOBILE PHONE</item>
      <price>156800</price>
      <hprice>444000</hprice>
      <aprice>313644</aprice>
    - <date>
        <year>2004</year>
        <month>11</month>
      </date>
      <maker_id>KTF</maker_id>
      <main_desc>KTF</main_desc>
      <main_desc>CMO8</main_desc>
      <main_desc>0.26 MEGA TFT LCD(2.0")</main_desc>
      <main_desc>MP3</main_desc>
      <main_desc>1.3 MEGA PIXEL CAMERA</main_desc>
      <main_desc>HOT CODE</main_desc>
      <keyword>KTF</keyword>
      <keyword>SLIM PHONE</keyword>                 ⎯402
      <keyword>DJ PHONE</keyword>
```

FIG. 6

THERE IS NO REGISTERED IMAGE.

| mall_id | PRODUCT ID | MODEL NAME | RELEASE DATE | MAKER | PRICE |
|---|---|---|---|---|---|
| 49shopping | 2547836 | | | DIGITAL&DIGITAL | 754,000 |

PRODUCT NAME: [6 MONTHLY INSTALLMENTS WITHOUT INTEREST/ INSTANT DISCOUNT BY 5%] PVR JUBILO COMBO [40G] (ALSO USED FOR DVD PLAYER) HTN-2040ND  — 601

HP CONDITION OF SALE: SELECT ▼  PINK-PRICE + CATEGORY  BLUE-CATEGORY  GREEN-PRICE  WHITE-OTHERS

SEARCHING: [ ]  SEARCH  SEE ALL CATEGORIES

602

| IMAGE | MAKER | BRAND | PRODUCT NAME | KIND OF PRODUCT | PRODUCT DESCRIPTION | LOWEST PRICE | HIGHEST PRICE | MATCH |
|---|---|---|---|---|---|---|---|---|
|  | DIGITAL & DIGITAL | JUBILO COMBO | HTV-2040ND (40G) | DIGITAL RECORDER | 40GB, PVR + DVD, DOLBY DIGITAL, DTS, SEARCH SCREEN, AND RECORD RESERVATION | 360,000 | 899,000 | MATCH |
|  | DIGITAL & DIGITAL | JUBILO COMBO | HTV-2040ND (60G) | DIGITAL RECORDER | 60 GB, PVR + DVD, TV PROGRAM RECORDING, EPG, DVD COPY, AND DOLBY DIGITAL | 748,000 | 930,000 | MATCH |

| INTERNAL IDENTIFIER 1101 | INTERNAL CATEGORY 1102 | SEARCH FIELD 1103 |
|---|---|---|
| KTF-X5500 | ELECTRONICS, MOBILE PHONES>MOBILE PHONES/PDAS/NAVIGATIONS>MOBILE PHONES | ⋮<br><brand>KTF EVER</brand><br><model>KTF-X5500</model><br><item>MOBILE PHONE</item><br>⋮<br><keyword>KTF</keyword><br><keyword>SLIMPHONE</keyword><br><keyword>DJPHONE</keyword><br>⋮ |
| ⋮ | ⋮ | ⋮ |

FIG. 14

URL : http://shoppingadmin.naver.com/shopping.search/category_index_new_sim.php?th=0.4

1420 — mall_id = interpark
cat_name = openmarket@living/health@living/bathroom@cleaning/washing
1410 — pname ⇒ sale food trash bin (cute design)/cleanness on your sink/hot sale food trash bin
price = 5900
price_range =4720 ~ 7080

1431 — query = food trash bin cute design cleanness on your sink food trash bin

| cat_id | cat_name1 | cat_name2 | cat_name3 | cat_name4 | count |
|---|---|---|---|---|---|
| 07020404 | living/kitchen | kitchen utensils | kitchen items | food trash bin | 4 |

1441

1432 — query = cleaning washing food trash bin cute design cleanness on your sink food trash bin

| cat_id | cat_name1 | cat_name2 | cat_name3 | cat_name4 | count |
|---|---|---|---|---|---|
| 07050003 | living/kitchen | washing/cleaningsupplies | cleaning supplies | bin/trashbin | 409 |
| 02041000 | clothing/underwear | women's wear | T-shirt | round neck | 237 |
| 00030700 | electronics/mobilephone | acoustics/hometheater | earphone/mobilephone/headset | earphone | 111 |

1442

1433 — query = open market living health living bathroom cleaning washing food trash bin cute design cleanness on your sink food trash bin

| cat_id | cat_name1 | cat_name2 | cat_name3 | cat_name4 | count |
|---|---|---|---|---|---|
| 07050003 | living/kitchen | washing/cleaningsupplies | cleaning supplies | bin/trashbin | 409 |
| 02041000 | clothing/underwear | women's wear | T-shirt | round neck | 322 |
| 110105050 | health/diet | living health | health supplies | other health supplies | 252 |

1443

AUTOMATIC MATCHING METHOD AND AUTOMATIC MATCHING SYSTEM

CROSS-REFERENCE TO RELATED APPLICATIONS

This application claims the benefit of Korean Patent Application No. 10-2006-0028327, filed on Mar. 29, 2006 and Korean Patent Application No. 10-2006-0028328, filed on Mar. 29, 2006 in the Korean Intellectual Property Office, the disclosures of which are incorporated herein by reference in their entirety.

BACKGROUND

1. Field

The present invention relates to an automatic matching method and system which can initially automatically match a category and an original query, and then perform a search within a designated category when matching a subsequent query, and thereby enable a more accurate query matching.

Also, the present invention relates to an automatic matching method and system which can exclude a stopword, which is repeatedly utilized without any direct relation to a registration requested product, and can match an optimal category for the product based on a query from which the stopword is excluded.

2. Discussion of the Related Technology

Generally, a shopping mall relay service indicates a service of informing a product purchaser about shopping malls that enter a predetermined relay website through a contract with a service provider. Specifically, the shopping mall relay service categorizes and introduces products, being sold in the shopping malls, and then provides the product purchaser with various types of information, such as a price comparison for each shopping mall with respect to the identical product, and the like.

As described above, the shopping mall relay service introduces products of the shopping malls to the product purchaser using various types of methods. When the product purchaser selects a particular product which is being sold at a particular shopping mall, the shopping mall relay service connects the product purchaser and the selected shopping mall, so that the affiliated shopping mall may substantially sell the product.

Product information registered in each of the shopping malls should be registered in a shopping mall relay server for the shopping mall relay service. Usually, product registration procedures should be performed, the procedures including: 1) registering product information, which a product registrant desires to sell, in a shopping mall server, 2) transmitting the registered product information from the shopping mall server to the shopping mall relay server, 3) a department section in charge of the shopping mall relay server, matching and arranging a product model name of the transmitted product information through a manual operation, and 4) registering the arranged product information in the shopping mall relay server.

Accordingly, the product registration procedure needs a great amount of time for the product registration and matching operation. Also, there is some constraint on operation resources. As an example, a ratio of unprocessed product information may exceed the ratio of registered product information.

Also, with an expansion of a marketplace, products also increase. In this situation, if the product registration procedure is utilized, the limitation of operation resources may be worsened.

Also, a database search system generally outputs only search results which accurately include an original query inputted from a user or another system. Specifically, the database search system cannot utilize a plurality of processes of various search logics on the original query and output a predetermined number of search results that may match the original query.

However, since a shopping mall relay server generally includes the above-described general database search system, 1) it may be difficult to retrieve a matching product model when a product registrant registers an incorrect product name in an affiliated shopping mall server, or a model name field of the product is blank, 2) since a search is not performed using a keyword registered in a product model, it may be difficult to retrieve a matching product model when the product name is registered as a particular keyword, 3) since a search is not performed using a search engine, it is not easy to perform the search using a Hangul product name, and 4) it may be difficult to retrieve a product model when a mistyped or omitted character is included in the product name registered in the affiliated shopping mall server by the product registrant.

Also, the shopping mall relay server searches all categories for a desired product model, and thus consumes a great amount of time and system resources. However, although a great amount of system resources are consumed, comparatively incorrect search results may be outputted and thus reliability may be deteriorated.

SUMMARY

An aspect of the present invention provides an automatic matching method and system which can automatically match a category and an original query prior to matching a query and thereby can more exactly match the query within a designated category.

Another aspect of the present invention also provides an automatic matching method and system which can outperform a database search method of providing only search results which accurately include an original query, and thereby can output a predetermined number of search results that may match the original query by processing the original query via a plurality of processes according to various search logics on the original query.

Another aspect of the present invention also provides an automatic matching method and system which can automate product registration/matching operations when loading product information registered in a shopping mall server and registering product information in a shopping mall relay server, and thereby can significantly reduce limitation of the operation resources.

Another aspect of the present invention also provides an automatic matching method and system which can effectively retrieve a product model having high probability of matching a corresponding query, by applying a different search logic according to a property of the product corresponding to each query.

Another aspect of the present invention also provides an automatic matching method and system which can extract a suitable query from an original query, which is a product name that a product registrant enters into a shopping mall server, and retrieve a product model matching a corresponding product using the extracted query, and thereby can pre-perform product registration/matching operations when the product registrant registers a product in the shopping mall server, and does not need an additional manual operation for the product registration/matching when registering the product in a shopping mall relay server.

Another aspect of the present also provides an automatic matching method and system which can recommend a category of a product based on a query from which a stopword is excluded, and thereby can reduce a matching error and exactly match a category and the query.

Another aspect of the present invention also provides an automatic matching method and system which can stop recommending of a category with respect to a query including a keyword, which is set as a prohibited word, and thereby can control a product, which is against public mores or inappropriate for characteristics of a product relay server, to be not sold.

Another aspect of the present invention also provides an automatic matching method and system which can create a query associated with an external identifier, and recommend an internal category, highly related to the created query, as a category corresponding to the external identifier, and thereby effectively match an appropriate category and the external identifier.

According to an aspect of the present invention, there is provided an automatic matching method, including: matching a category and an original query; searching a predetermined database for a first search result in the matched category by using a first query, the first query being created by removing a space or a special character from the original query; separating the original query into a plurality of words according to the space, and searching the database for a second search result in the matched category by using a second query when a number of the first search results is less than a predetermined reference value, the second query being created by including any one or a combination of at least two of alphabetic characters, and special characters among the plurality of words; searching the database for a third search result in the matched category by using a third query when a sum of the number of first search results and a number of second search results is less than the reference value, the third value corresponding to a word of which a first character includes an alphabetic character, and of which a last character includes either an alphabetic character or a numeral, and which includes at least one numeral, among the second query; and outputting at least one of the first search result, the second search result, and the third search result, as a total search result which matches the original query.

According to another aspect of the present invention, there is provided an automatic matching method, including: receiving an external identifier and an external category including the external identifier, in association with a registration request for a product; excluding a stopword from the external category or the external category; creating a query using the external identifier or the external category from which the stopword is excluded; and recommending a category according to the query.

One aspect of the invention provides a method of deriving a desirable identification of a commodity. The method comprises: providing a commodity list comprising names of commodities; providing an undesirable word list comprising undesirable words to use in identifying commodities; receiving, from a remote terminal, a proposed phrase for identifying a product or service, the proposed phrase comprising a first term and a second term that are separated by a space therebetween; determining whether the commodity list includes the proposed phrase as a whole; if determined that the commodity list does not include the proposed phrase as a whole, then determining whether the commodity list includes the first term as a whole or the second term as a whole; if determined that the commodity list includes neither the first term as a whole nor the second term as a whole, then determining whether the first term incorporates one or more undesirable words of the undesirable word list; if determined that the first term incorporates an undesirable word therein, then removing the undesirable word from the first term so as to create a modified first term excluding the undesirable word; and determining whether the commodity list includes the modified first term as a whole.

In the foregoing method, if it is determined that the commodity list includes the modified first term as a whole, then the method may further comprise determining the modified first term as a desirable identification for the product or service.

The foregoing method may further comprise transmitting, to the remote terminal, the desirable identification of the product or service. The method may still further comprise receiving, from the remote terminal, a bid for using the desirable identification for a computerized advertisement service, wherein the computerized advertisement service involves displaying a link to a website for selling the product or service in reply to a computerized search request using the desirable identification.

In the foregoing method, if it is determined that the commodity list does not include the modified first term as a whole, then the method may further comprise determining whether the modified first term incorporates any of the names of commodities of the commodity list.

In the foregoing method, if it is determined that the modified first term incorporates two or more names of commodities therein, then the method may further comprise transmitting, to the remote terminal, the two or more names of commodities as desirable identifications for the product or service, wherein within the modified first term, the two or more names are not separated by a space therebetween.

In the foregoing method, if it is determined that the modified first term incorporates two or more names of commodities therein, then the method may further comprise transmitting, to the remote terminal, the two or more names of commodities as desirable identifications for the product or service, wherein within the modified first term, the two or more names are separated by a space therebetween.

In the foregoing method, the undesirable word may be selected from the group consisting of a word, an expression and a string of letters that describe a quality, quantity, price or aesthetic of the product or service.

Other aspect of the invention provides a method of deriving a desirable identification of a commodity. The method comprises: providing a commodity list comprising names of commodities; providing an undesirable word list comprising undesirable words to use in identifying commodities; receiving a proposed phrase for identifying a product or service; determining whether the proposed phrase incorporates one or more undesirable words of the undesirable word list; if determined that the proposed phrase incorporates an undesirable word therein, then removing the undesirable word from the proposed phrase so as to create a modified phrase excluding the undesirable word; and determining whether the commodity list includes the modified phrase as a whole.

In the foregoing method, prior to determining whether the proposed phrase incorporates one or more undesirable words, the method may further comprise determining whether the commodity list includes the proposed phrase as a whole. If it is determined that the commodity list includes the modified phrase as a whole, then the method further comprises determining the modified phrase as a desirable identification for the product or service.

The foregoing method may further comprise transmitting, to the remote terminal, the desirable identification of the product or service. The method may further comprising receiving, from the remote terminal, a bid for using the desirable identification for a computerized advertisement service, wherein the computerized advertisement service involves displaying a link to a website for selling the product or service in reply to a computerized search request using the desirable identification.

In the foregoing method, if it is determined that the commodity list does not include the modified phrase as a whole, then the method may further comprise determining whether the modified phrase incorporates any of the names of commodities of the commodity list.

In the foregoing method, if it is determined that the modified phrase incorporates two or more names of commodities therein, then the method may further comprise transmitting, to the remote terminal, the two or more names of commodities as desirable identifications for the product or service, wherein within the modified phrase, the two or more names are not separated by a space therebetween.

In the foregoing method, if it is determined that the modified phrase incorporates two or more names of commodities therein, then the method may further comprises transmitting, to the remote terminal, the two or more names of commodities as desirable identifications for the product or service, wherein within the modified phrase, the two or more names are separated by a space therebetween.

In the foregoing method, the undesirable word may be selected from the group consisting of a word, an expression and a string of letters that describe a quality, quantity, price or aesthetic of the product or service.

Another aspect of the invention provides a method of processing a phrase for identifying a product in connection with a computerized advertisement service of the product. The method comprises: transmitting, to a remote server, a proposed phrase for identifying a product, the proposed phrase comprising a first term and a second term that are separated by a space therebetween, wherein the first term incorporates an undesirable word to use in identifying the product, wherein the undesirable word is one that describes at least one selected from the group consisting of quality, quantity, price and aesthetic of the product; receiving, from the remote server, a desirable identification for identifying the product, wherein the desirable identification comprises a portion of the first term excluding the undesirable word; and transmitting, to the remote server, an offer for using the desirable identification for a computerized advertisement service. The computerized advertisement service involves: receiving, from a terminal, a request for a computerized search using the desirable identification, and transmitting data for displaying, on a screen associated with the terminal, a link to a website for selling the product in reply to the search request.

In the foregoing method, within the first term, the undesirable word and the desirable identification may not be separated by a space therebetween. The desirable identification may further comprise at least a portion of the second term. The desirable identification may not comprise any part of the second term. The remote server may perform a method comprising: providing a commodity list comprising names of commodities; providing an undesirable word list comprising undesirable words to use in identifying commodities; receiving the proposed phrase; determining whether the commodity list includes the proposed phrase as a whole; if determined that the commodity list does not include the proposed phrase as a whole, then determining whether the commodity list includes the first term as a whole or the second term as a whole; if determined that the commodity list includes neither the first term as a whole nor the second term as a whole, then determining whether the first term incorporates one or more undesirable words of the undesirable word list, wherein the remote server determines that the first term incorporates the undesirable word; removing the undesirable word from the first term so as to create a modified first term excluding the undesirable word; determining whether the commodity list includes the modified first term as a whole; if determined that the commodity list includes the modified first term as a whole, then determining the modified first term as the desirable identification; transmitting the desirable identification.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 4 illustrates an example of a search field according to an exemplary embodiment of the present invention;

FIG. 6 illustrates another example of a search result view which can be outputted by performing an automatic matching method according to an exemplary embodiment of the present invention;

FIG. 8 illustrates still another example of a search result view which can be outputted by performing an automatic matching method according to an exemplary embodiment of the present invention;

FIG. 11 illustrates an example of a category database according to an exemplary embodiment of the present invention;

FIG. 14 illustrates an example of a view where internal identifiers are counted for each internal category using a query according to an exemplary embodiment of the present invention;

DETAILED DESCRIPTION OF EMBODIMENTS

Figure 1:
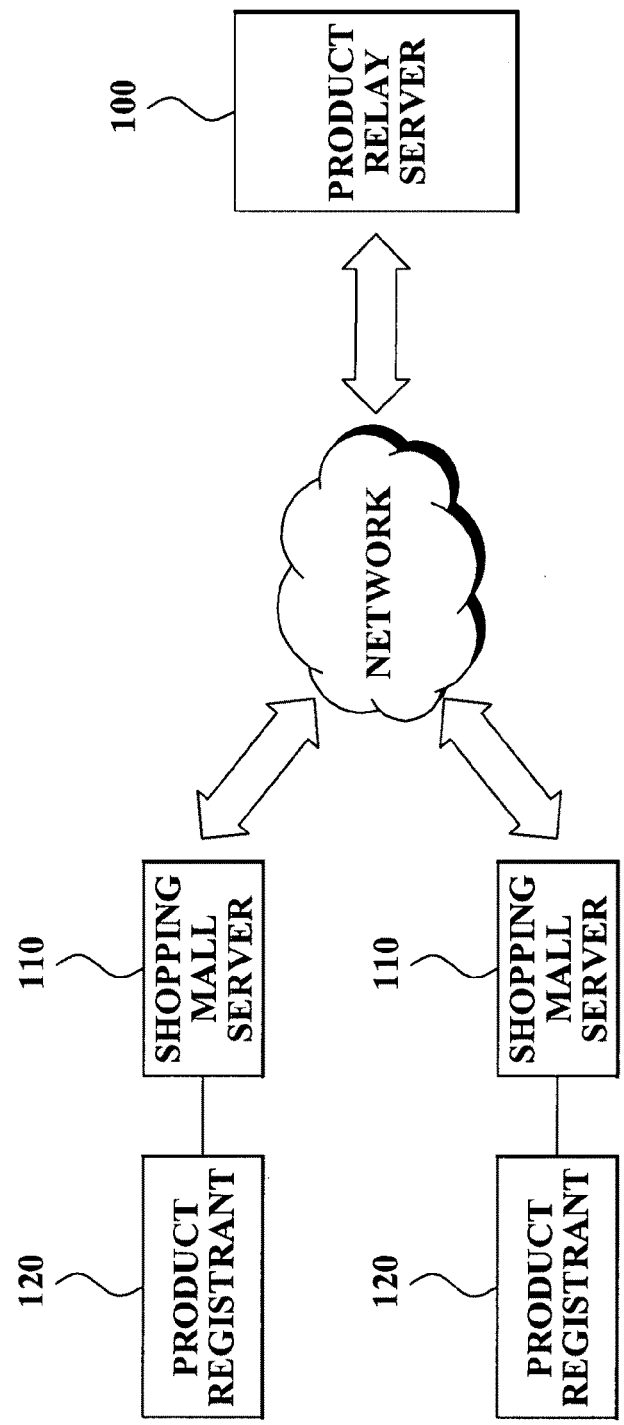
FIG. 1 illustrates a network connection among a product relay server, a shopping mall server, and a product registrant according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

The term 'stopword' used throughout the present specification may indicate an external identifier of a product name entered by an advertiser when the advertiser registers a product in a relay server, or may indicate a keyword which is repeatedly included in an external category including the external identifier. Examples of the stopword may include a bargain price, an ultra bargain price, a special price, and the like, which are utilized as the product name. When the stopword is included in a query, the stopword may cause a wrong category match. Accordingly, an automatic matching system according to one embodiment of the present invention creates the query using either the external category or the external identifier from which the stopword is excluded.

Also, the terms 'internal identifier' and 'internal category' may indicate an identifier and a category which are utilized in a relay server relaying a product, registered in a predetermined shopping server, and selling the product as a proxy. Also, the internal identifier and the internal category may indicate an identifier and a category which are utilized in the shopping server. In this instance, the identifier may include a product name, a file name, a knowledge keyword, a news title, and the like, to identify a product, a multimedia file, knowledge, news, and the like.

For example, the internal identifier and the internal category may correspond to an identifier and a category which are utilized in a predetermined product relay server. Also, the external identifier and the external category may correspond to an identifier and a category which are used by shopping mall servers affiliated with the product relay server.

FIG. 1 illustrates a network connection among a product relay server 100, a shopping mall server 110, and a product registrant 120 according to an exemplary embodiment of the present invention.

An automatic matching method according to an exemplary embodiment of the present invention may be performed by a predetermined automatic matching system. The automatic matching system may interoperate with the product relay server 100, the shopping mall server 110, and the product registrant 120.

Specifically, the automatic matching system may create a query which excludes a predetermined stopword, and exactly match a category and a product, requested for a new registration, using the created query from which the stopword is excluded. For example, the automatic matching system may set common phrases, inserted comments, and the like, which are repeatedly included when additionally registering the product, to stopwords and then exclude a keyword corresponding to the set stopwords when creating the query.

Also, the automatic matching system may utilize a prohibited word to identify a product which is not allowed to be sold in the product relay server 100. When the prohibited word is included in either a product name corresponding to the external identifier, or a product category corresponding to the external category, the automatic matching system may perform a predetermined process to refuse registration of the product. For example, the automatic matching system may not relay and sell a product which is against public mores. Specifically, the automatic matching system may set keywords, such as 'condom', 'love gel', and the like, to prohibited words, and may not register a product, including any one of the keywords as a product name. Specifically, the automatic matching system may not perform an automatic category matching.

The product relay server 100 may indicate a commercial search server supporting a search operation with respect to a product and a shopping mall, to display information about a desired product for a searcher or to enable the searcher to readily access the shopping mall server 110 selling the product. Specifically, the product relay server 100 functions to retrieve the shopping mall server 110 capable of providing product information about a particular product requested by a user, create search results, and sort the search results in a search result list for the user. In this instance, the product information may include product specifications, product prices, available shopping malls, and the like.

The shopping mall server 110 may indicate a service server which advertises a selling product as proxy through a product relay service by the product relay server 100. Specifically, the shopping mall server 110 may indicate a server which performs substantial processes associated with sales of a product, such as selling the product to the searcher accessing via the product relay server 100, billing according to selling of the product, delivering the sold product to the searcher, and the like.

Specifically, the shopping mall server 100 may enable the product relay server 100, capable of readily securing a plurality of searchers, to display product advertising or shopping mall advertising of the shopping mall server 100, so that the plurality of searchers may access a corresponding website. Accordingly, a purchase success rate of a selling product may be increased based on the accessed searchers. Also, the shopping mall server 110 may provide the searcher with search results via the product relay server 100, in response to a search request from the searcher accessing the product relay server 100. In this instance, the search results include product information about the product which is being sold in the shopping mall server 110.

The product registrant 120 may indicate a commercial Internet user which makes the product relay server 100 execute advertising/sales of a product, as proxy, which is being sold in the shopping mall server 110 or additionally registered in the shopping mall server 110.

The automatic matching system maintains a category database which includes an internal identifier (product identifier) which is used in the product relay server 100, and an internal category (product category) which includes the internal identifier. Also, the automatic matching system receives an external identifier (product identifier) and an external category (product category) of a product, requested for a registration, from the shopping mall server 110.

Also, the automatic matching system creates a query by using the received external identifier or the external category including the external identifier. The created query is utilized for category matching. In this instance, the automatic matching system may create the query by using only the external identifier (product identifier). Also, the automatic matching system may create the query by using the external identifier and the external category which includes the external identifier. As described above, the query may be created by using various types of methods. Any method of creating the query using the external identifier, as described in the present invention, may fall within the scope of the spirit of the present invention. For example, the automatic matching system may create the query by removing a space from the external identifier, create the query for each space of the external identifier, or may create the query by analyzing a morpheme of the external identifier. Also, the automatic matching system may create the query by removing a space from the external identifier and the external category, create the query for each space of the external identifier and the external category, or may create the query by analyzing a morpheme of the external identifier and the external category. In this instance, when the external category has a hierarchical structure, the automatic matching system may utilize only a partial stratum of the external category to create the query. For example, when the received category is 'openmarket@living/health@living/bathroom@cleaning/washing', the automatic matching system may utilize only a bottom stratum category, 'cleaning/washing', to create the query.

The automatic matching system recommends at least one of internal categories, stored in the category database, as a category corresponding to the external identifier by using the created query. In this instance, the automatic matching system may automatically match a most appropriate internal category with the category corresponding to the external identifier.

Generally, when identifiers, such as product identifiers, and the like, are similar to each other, categories of the identifiers may also be similar to each other. As described above, according to one embodiment of the present invention, an automatic matching method may search a category database using a query about an external identifier and thereby recommend a category which includes a greater number of internal identifiers more similar to the external identifier. Accordingly, it is possible to quickly and accurately set a category corresponding to the external identifier, such as a new product identifier, and the like.

Figure 2:
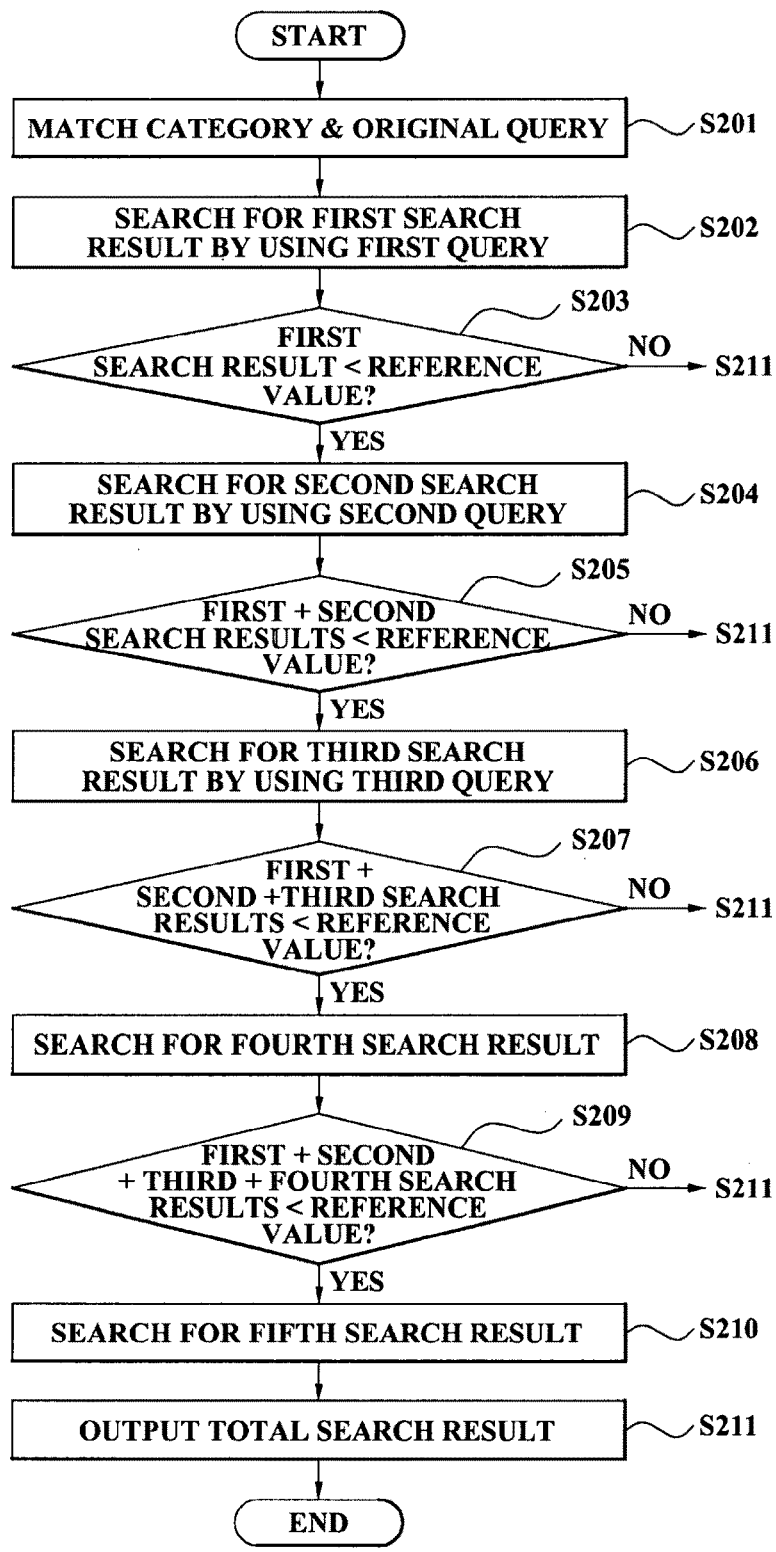
FIG. 2 is a flowchart illustrating an automatic matching method according to an exemplary embodiment of the present invention.

FIG. 2 is a flowchart illustrating an automatic matching method according to an exemplary embodiment of the present invention.

The automatic matching method according to the present exemplary embodiment may be performed with respect to a predetermined database including a search index. Also, the automatic matching method may be performed by a predetermined automatic matching system.

In operation S201, the automatic matching system matches a category and an original query. Specifically, the automatic matching system receives the original query which is entered for search, and an original category which includes the original query. Also, the automatic matching system creates a search query by using the received original query and the original category. In this instance, the search query may correspond to a group of search words which are utilized to search a category database for a category to be recommended for the original query.

For the category recommendation, the category database includes an internal identifier and an internal category including the internal identifier. The automatic matching system searches the category database using the search query, and extracts internal identifiers having a level of similarity to the search query greater than or equal to a predetermined level from the category database by using the search query. Also, the automatic matching system recommends at least one internal category, as the category corresponding to the original query, depending upon a number of the extracted internal identifiers included in each of the at least one internal category. In this instance, the internal identifier and the internal category may indicate an identifier and a category which are used in a server itself, and function to identify an externally entered original query or an original category in the server.

For example, with respect to an externally entered original query 'Hanilelectronics[3% discountcoupon][additionaldiscount] open-and-close type ventilation fan TG EKS-150AT' and an original category 'electronics/mobilephone@homeappliances@otherhomeappliances', the automatic matching system creates a search query using the original query or the original category. Also, the automatic matching system may extract internal identifiers, having a level of similarity to the search query greater than or equal to a predetermined level, from the category database by using the created search query. In this instance, the internal identifiers may include 'electronics/mobilephone', 'homeappliances', 'small-sizedhomeappliances', 'ventilation fan', and the like. Also, the automatic matching system may search the category database for an internal category including a greater number of the internal categories, 'electronics/mobilephone', 'homeappliances', 'small-sizedhomeappliances', 'ventilation fan', and the like, and recommend the retrieved internal category as the recommendation category.

When creating the search query, the automatic matching system may create the search query by using only the received original query. Also, the automatic matching system may create the search query by using the original query and the original category. In this instance, the original category may include fields formed in a hierarchical structure. The automatic matching system may create the search query by using the entire or a partial hierarchical field of the original category.

For example, the automatic matching system may create a search query 'Hanil electronics 3% discount coupon additional discount open-and-close type ventilation fan TG EKS-150AT electronics mobile phone home appliances other home appliances' by using the original query 'Hanilelectronics[3% discountcoupon][additionaldiscount] open-and-close type ventilation fan TG EKS-150AT' and the entire stratums 'homeappliances/mobilephone, homeappliances, other home appliances' of the original category.

For another example, the automatic matching system may create a search query 'Hanil electronics 3% discount coupon additional discount open-and-close type ventilation fan TG EKS-150AT other home appliances' by using the original query 'Hanilelectronics[3% discountcoupon][additionaldiscount] open-and-close type ventilation fan TG EKS-150AT', and a bottom stratum 'other home appliances' of the original category.

Also, the automatic matching system may create the search query using various types of methods. Any method of creating the query using the external identifier, as described in the present invention, may fall within the scope of the spirit of the present invention. For example, the automatic matching system may create the search query by removing a space from the original query or the original category, create the query for each space of the original query or the original category, or may create the search query by analyzing a morpheme of the original query or the original category.

According to the present exemplary embodiment, automatic category matching is performed with respect to the original query, prior to a query matching process. Accordingly, it is possible to accurately perform the query matching process within a designated category.

In operation S202, the automatic matching system searches a predetermined database for a first search result in the matched category by using a first query. In this instance, the first query is created by removing a space or a special character from the original query.

For example, the automatic matching system may create the first query by removing whitespace, '/', '−', '+', and '[/]' from the original query, and may search the retrieved category for the first search result including the first query.

In operation S203, the automatic matching system determines whether a number of the first results is less than a predetermined reference value.

For example, the predetermined reference value may be set to any one of 2 to 10. When the reference value is 5, the automatic matching system may determine whether to perform a subsequent operation by determining whether the number of first search results is less than 5 in operation S203.

When the number of first search results is determined to be not less than the reference value in operation S203, operation S211 is performed to output the first search result as a total search result. Conversely, when the number of first search results is determined to be less than the reference value in operation S203, operation S204 is performed.

In operation S204, the automatic matching system separates the original query into a plurality of words according to the space, and searches the database for a second search result in the matched category by using a second query. In this instance, the second query consists of any one or a combination of at least two of alphabetic characters, numerals, and the special characters among the plurality of words.

For example, the automatic matching system may separate the original query by 'blank', create words, consisting of only alphabetic characters, numerals, '/', '−', and '+', as the second query. Also, the automatic matching system may search the matched category for the second search result by using the created second query. The described process is performed with assumption that English words have more important meaning. According to the assumption, words determined to be unnecessary for searching the database may be removed.

In operation S205, the automatic matching system determines whether a sum of the number of first search results and a number of second search results is less than the reference value.

For example, when the reference value is 5, the automatic matching system may determine a subsequent operation by determining whether the sum of the number of first search results and the number of second search results is less than 5.

When the sum of the number of first search results and the number of second search results is determined to be not less than the reference value in operation S205, operation S211 is performed to output the first search result and the second search result as a total search result. Conversely, when the sum of the number of first search results and the number of second search results is determined to be less than the reference value in operation S205, operation S206 is performed.

In operation S206, the automatic matching system searches the database for a third search result in the matched category by using a third query. The third value corresponds to a word of which a first character includes an alphabetic character, and of which a last character includes either an alphabetic character or a numeral, and which includes at least one numeral, among the second query In this instance, the automatic matching system sorts a plurality of third queries in a descending order according to a length of each of the third queries. Also, the automatic matching system searches the matched category for the third search result according to the sorted order.

Figure 3:
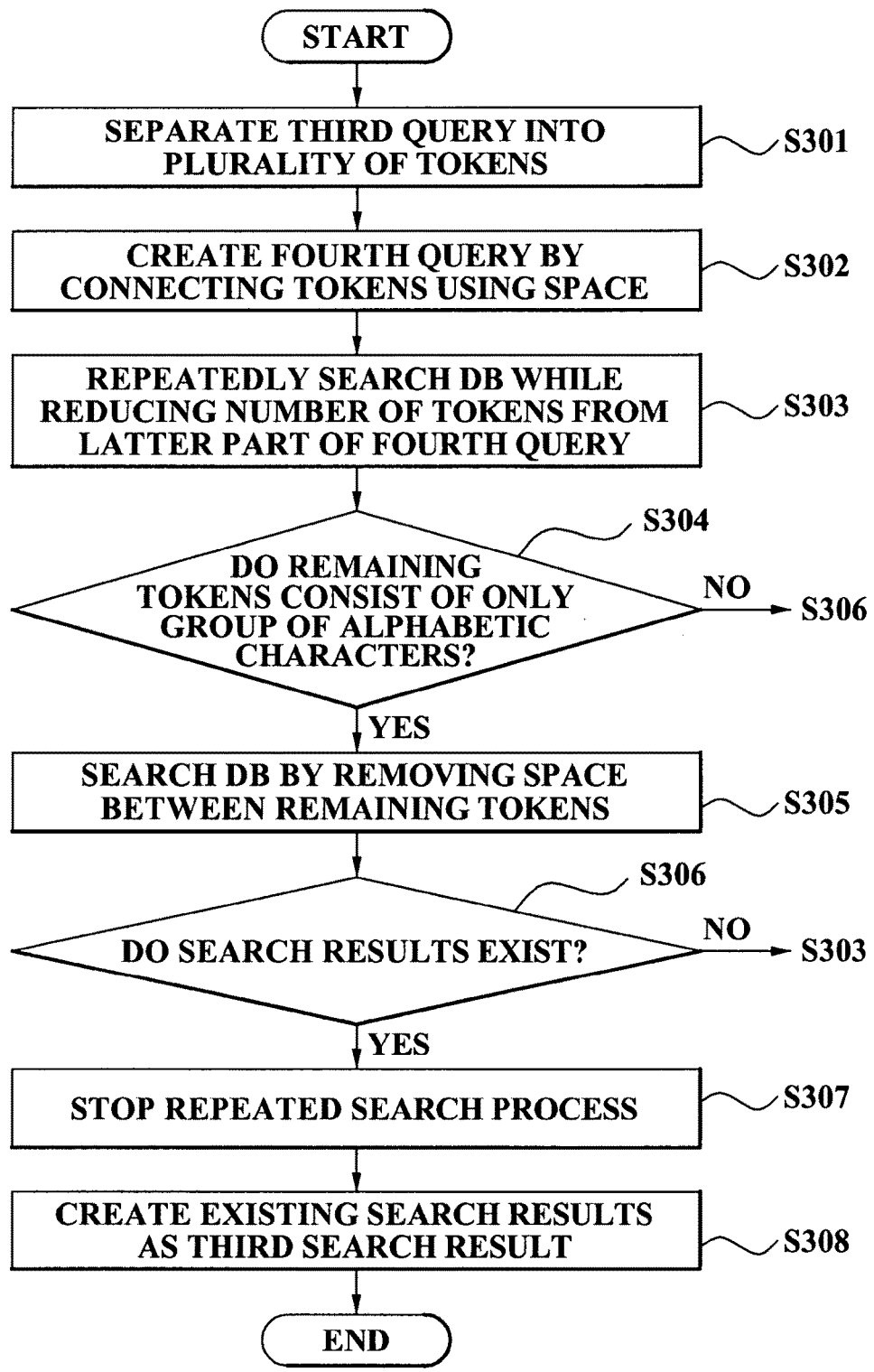
FIG. 3 is a flowchart illustrating a process of separating a third search query into a plurality of tokens and then outputting search results corresponding to an original query via various processing logics according to an exemplary embodiment of the present invention.

FIG. 3 is a flowchart illustrating a process of separating a third search query into a plurality of tokens and then outputting search results corresponding to an original query via various processing logics according to an exemplary embodiment of the present invention. In this instance, operations S301 through S308 may be included in operation S206 of FIG. 2.

In operation S301, the automatic matching system separates the third query into tokens consisting of a group of only alphabetic characters or a group of only numerals.

For example, the query matching system may separate the third query, for example, TG EKS-150AT, into the plurality of tokens consisting of a group of only alphabetic characters or a group of only numerals, such as, 'TG', 'EKS', '150', and 'AT'.

In operation S302, the automatic matching system creates a fourth query by connecting the tokens using a space 'blank'. In operation S303, the automatic matching system may repeatedly search the database while reducing a number of the tokens, included in the fourth query, from a latter part of the fourth query.

For example, the query matching system may repeatedly search the database while reducing the number of tokens, included in the fourth query, from the latter part of the fourth query in an order of 'TG EKS 150 AT', 'TG EKS 150', and 'TG EKS'.

In operation S304, the automatic matching system determines whether remaining tokens while performing operation S303 correspond to the group of only alphabetic characters.

When the remaining tokens do not correspond to the group of only alphabetic characters, operation S306 is performed to determine whether search results exist. Conversely, when the remaining tokens correspond to the group of only alphabetic characters, operation S305 is performed.

In operation S305, the automatic matching system searches the database by removing the space between the remaining tokens.

For example, the automatic matching system may separate the third query, for example, TG EKS-150AT, into the plurality of tokens consisting of the group of only alphabetic characters or numerals, such as 'TG', 'EKS', '150', and 'AT' in operation S301, and may create the fourth query 'EKS 150 AT' by connecting the tokens using the space in operation S302. Also, the automatic matching system may search the database using 'TG EKS 150 AT', 'TG EKS 150', and 'TG EKS' while reducing the tokens from the latter part of the fourth query in operation S303. When the remaining tokens, such as 'TG EKS', are determined to correspond to tokens consisting of the group of only alphabetic characters in operation S304, the automatic matching system may create 'TGEKS' by removing the space between the remaining tokens and search the database by using 'TGEKS' in operation S305.

In operation S306, the automatic matching system determines whether search results exist in the search process of operation S305. When the search results exist, the automatic matching system stops the search process in operation S307. Conversely, when the search results do not exist, the search process is repeatedly performed from operation S303.

In the above-described example, the automatic matching system may search the database by using 'TGEKS'. However, when the search results are determined to not exist in operation S306, operation S303 is performed to repeatedly search the database by reducing the number of tokens from the latter part, such as 'TG EKS 150' and 'TG EKS'.

While performing operations S303 through S305, when it is determined that the search results exist in operation S306, the automatic matching system stops the repeated search process in operation S307 and creates the existing search results as the third search result in operation S308.

According to an exemplary embodiment of the present invention, there is provided an automatic matching method in which a search index, included in the database, includes a plurality of search fields including a product model name field and a keyword field, and operation S206 of FIG. 2, including operation S301 through S308 of FIG. 3, is limitedly performed with respect to the product model name field and the keyword field of the search index.

FIG. 4 illustrates an example of a search field according to an exemplary embodiment of the present invention.

As shown in FIG. 4, the search index, included in the database, includes a plurality of search fields, such as a product model name field 401, a keyword field 402, a category field, a brand field, a price field, and a production date field.

Generally, when searching the database, all the search fields of the search index should be searched. However, depending upon an exemplary embodiment of the present invention, to improve search speed, operations S206 of FIG. 2, including operations S301 through S308 shown in FIG. 3, may be limitedly performed with respect to the product model name field 401 and the keyword field 402 of the search index.

A shopping mall relay server includes a general database search system. Accordingly, the shopping mall relay server does not retrieve a keyword registered in a product model. Also, when a product name is registered as a particular keyword, a matching product model may not be retrieved. However, according to one embodiment of the present invention, the automatic matching system may search the keyword field 402. Accordingly, even when the product name is registered as the particular keyword, the automatic matching system may retrieve and output the matching product model.

Operation S206 of searching for a third search result has been described in detail with reference to FIG. 3. Hereinafter, the present invention will be described with reference again to FIG. 2.

In operation S207, the automatic matching system determines whether a sum of the number of first through third search results is less than the reference value.

For example, when the reference value is 5, the automatic matching system may determine whether the sum of the number of first through third search results is less than 5 in operation S207, and determine a subsequent process.

When the sum of the number of first through third search result is determined to be not less than the reference value in operation S207, operation S211 is performed to output the first through third search results as the total search result. Conversely, when the sum of the number of first through third search results is determined to be less than the reference value in operation S207, operation S208 is performed.

In operation S208, the automatic matching system separates a token from the original query via a predetermined engine indexer, and searches the database for a fourth search result in the matched category by using the token.

In operation S209, the automatic matching system determines whether a sum of the number of first through fourth search result is less than the reference value. When the sum of the number of first through fourth search results is determined to be not less than the predetermined reference value in operation S209, operation S211 is performed to output the first through fourth search results as the total search result. Conversely, when the sum of the number of first through fourth search results is determined to be less than the reference value in operation S209, operation S210 is performed.

In operation S210, the automatic matching system searches the matched category for a fifth search result. In this instance, the fifth search result includes at least one token. Specifically, the automatic matching system performs a search with respect to all words including at least one token when the sum of the search results is less than the reference value.

In operation S211, the automatic matching system outputs at least one of the first through fifth search results as the total search result which matches the original query.

Figure 5:
FIG. 5 illustrates an example of a search result view which can be outputted by performing an automatic matching method according to an exemplary embodiment of the present invention.

FIG. 5 illustrates an example of a search result view which can be outputted by performing an automatic matching method according to an exemplary embodiment of the present invention.

A shopping mall relay server includes a general database search system. Accordingly, when a product name of a product, registered by a product registrant via a shopping mall server, is incorrect or a model name field corresponding to the product is blank, it is difficult to retrieve a matching product model. A field 501, shown in FIG. 5, indicates a search result. When the model name field is blank as shown in the field 501, the matching process can only fail.

However, according to one embodiment of the present invention, even when the model name field is blank, a product name 502 corresponding to the original query is processed according to various search logics shown in FIGS. 2 and 3 to perform a search, and thus a product model exactly matching the product name 502 may be retrieved as shown in a field 503.

Also, according to one embodiment of the present invention, the search operation is limitedly performed with respect to a category which is retrieved by performing an automatic category matching with respect to the product name 502. Accordingly, it is possible to enable a database search system to more accurately search for a product model.

For example, when the product name 502 of FIG. 5 corresponding to the original query is "[six monthly installments without interest/instant discount by 5%] portable multimedia player (PMP) AV340R (40 GB)", and is processed through operation S206, the automatic matching system may 1) separate the original query using the space, 2) extract words consisting of a group of only alphabetic characters, a group of only numerals, and a group of only special characters, and then 3) determine a word, as a third query, of which a first character includes an alphabetic character, and of which a last character includes either an alphabetic character or a numeral, and which includes at least one numeral. Accordingly, the automatic matching system processes the product name 502 through operation S206, and determines 'AV340R' as the third query.

In operation S301, the automatic matching system according to one embodiment of the present invention separates the third query 'AV340R' into tokens consisting of a group of only alphabetic characters or a group of only numerals. In operation S302, the automatic matching system creates a fourth query by connecting the tokens using the space. Accordingly, 'AV 340 R' is determined as the fourth query.

In operation S303, the automatic matching system repeatedly searches the database while reducing a number of tokens from a latter part of the fourth query. Accordingly, the automatic matching system may repeatedly search the database in an order of 'AV 340 R', 'AV 340', and 'AV'. When a search result exists while searching in operation S306, the automatic matching system may stop the repeated search operation in operation S307, and create the search result as the third search result in operation S308.

Referring again to FIG. 5, a search result which includes a product model name "AV340(40G)" in the field 503 is outputted. Accordingly, it can be known that the automatic matching system searched the database using 'AV 340', identified that the search results with the product model name "AV340(40G)" existed, and then stopped the repeated search operation, and displayed the search results on a search result view.

As described above, according to one embodiment of the present invention, although the model name field is blank, the automatic matching system performs a search with respect to the product name 502 corresponding to the original query according to various search logics as shown in FIGS. 2 and 3. Accordingly, as shown in the field 503, it is possible to accurately output a product model which exactly matches the product name 502.

FIG. 6 illustrates another example of a search result view which can be outputted by performing an automatic matching method according to an exemplary embodiment of the present invention.

A shopping mall relay server includes a general database search system. Accordingly, when a mistyped or an incorrect character is included in a product name of a product, registered by a product registrant via a shopping mall server, it is difficult to retrieve a matching product model.

However, according to one embodiment of the present invention, even when the mistyped or incorrect character is included in the product name, a product name 601 corresponding to the original query is processed according to various search logics shown in FIGS. 2 and 3 to perform a search, and thus a product model exactly matching the product name 601 may be accurately retrieved and outputted. In FIG. 6, the automatic matching system performs a search with respect to a mistyped '~HTN-2040ND' according to the above-described search logic, and accurately retrieves 'HTV-2040ND (40G)' or 'HTV-2040ND(60G)' as search results 602.

Also, the automatic matching method according to various search logics described with FIGS. 2 and 3 may be performed by a predetermined product information registration system including the automatic matching system according to one embodiment of the present invention. A search index, included in the database, may include a plurality of search fields about a product model. In this instance, the product model may correspond to a product model categorized into electronics/computers.

In the case of the product model, categorized into electronics/computers, most product model names consist of a combination of alphabetic characters, numerals, and special characters, and Hangul is generally utilized to describe the product. Accordingly, when performing a search according to the automatic matching method as shown in FIGS. 2 and 3, very appropriate search results may be outputted.

Hereinafter, an automatic matching method according to another exemplary embodiment of the present invention will be described.

Figure 7:
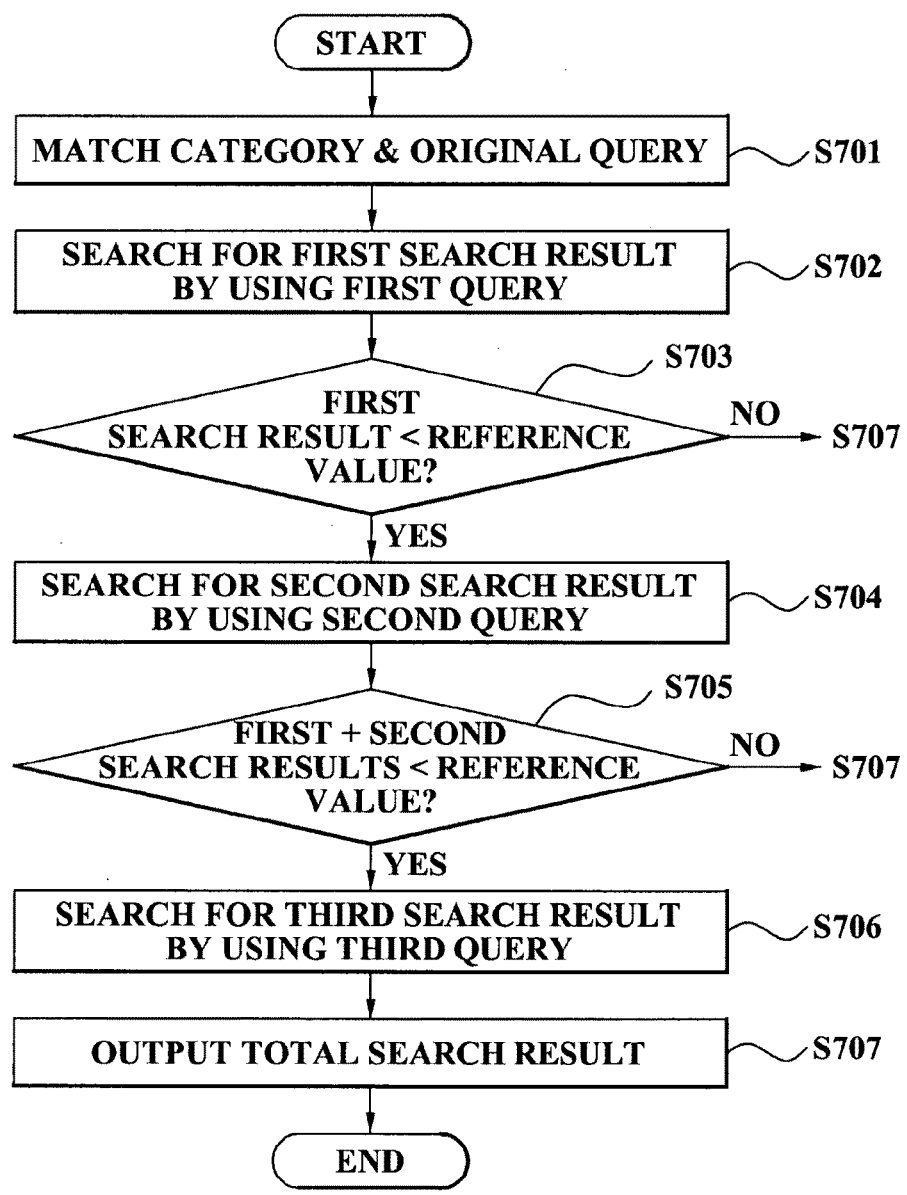
FIG. 7 is a flowchart illustrating an automatic matching method according to another exemplary embodiment of the present invention.

FIG. 7 is a flowchart illustrating an automatic matching method according to another exemplary embodiment of the present invention. The automatic matching method may be performed with respect to a predetermined database including a search index. Also, the automatic matching method may be performed by a predetermined automatic matching system.

In operation S701, the automatic matching system matches a category and an original query. Operation S701 is a process of initially designating the category of the original query, and is similar or identical to operation S201 of FIG. 2 as described above. Accordingly, further detailed descriptions related thereto will be omitted. Automatic category matching with respect to the original query is performed prior to a query matching process. Accordingly, the automatic matching system may more accurately perform the query matching process within the designated category.

In operation S702, the automatic matching system searches a predetermined database for a first search result in the matched category by using a first query. In this instance, the first query is created by removing a space or a special character from the original query.

In operation S703, the automatic matching system determines whether a number of the first results is less than a predetermined reference value. When the number of first search results is determined to be not less than the reference value in operation S703, operation S707 is performed to output the first search result as a total search result. Conversely, when the number of first search results is determined to be less than the reference value in operation S703, operation S704 is performed.

In operation S704, the automatic matching system searches the database for a second search result in the matched category by using a second query. In this instance, the second query is created by separating the original query into a plurality of words according to the space.

In operation S705, the automatic matching system determines whether a sum of the number of first search results and a number of second search results is less than the reference value. When the sum of the number of first search results and the number of second search results is determined to be not less than the predetermined reference value in operation S705, operation S707 is performed to output the first search results and the second search result as a total search result. Conversely, when the sum of the number of first search results and the number of second search results is determined to be less than the predetermined reference value in operation S705, operation S706 is performed.

In operation S706, the automatic matching system searches the database for a third search result in the matched category by using a third query. In this instance, the third query is created by analyzing a morpheme of the original query.

In operation S707, the automatic matching system outputs at least one of the first through third search results as the total search result.

The automatic matching method according to the present exemplary embodiment may be performed by a predetermined product information registration system including the automatic matching system according to one embodiment of the present invention. Also, a search index, included in the database, may include a plurality of fields about a product model. In this instance, the product model may correspond to a product model categorized into cosmetics, powered milk, diapers, and other products.

In the case of the product model, categorized into cosmetics, powered milk, diapers, and other products, most product model names consist of Hangul. Accordingly, when performing a search using the automatic matching method according to the present exemplary embodiment rather than the above-described exemplary embodiment, more appropriate search results may be outputted.

Figure 8:
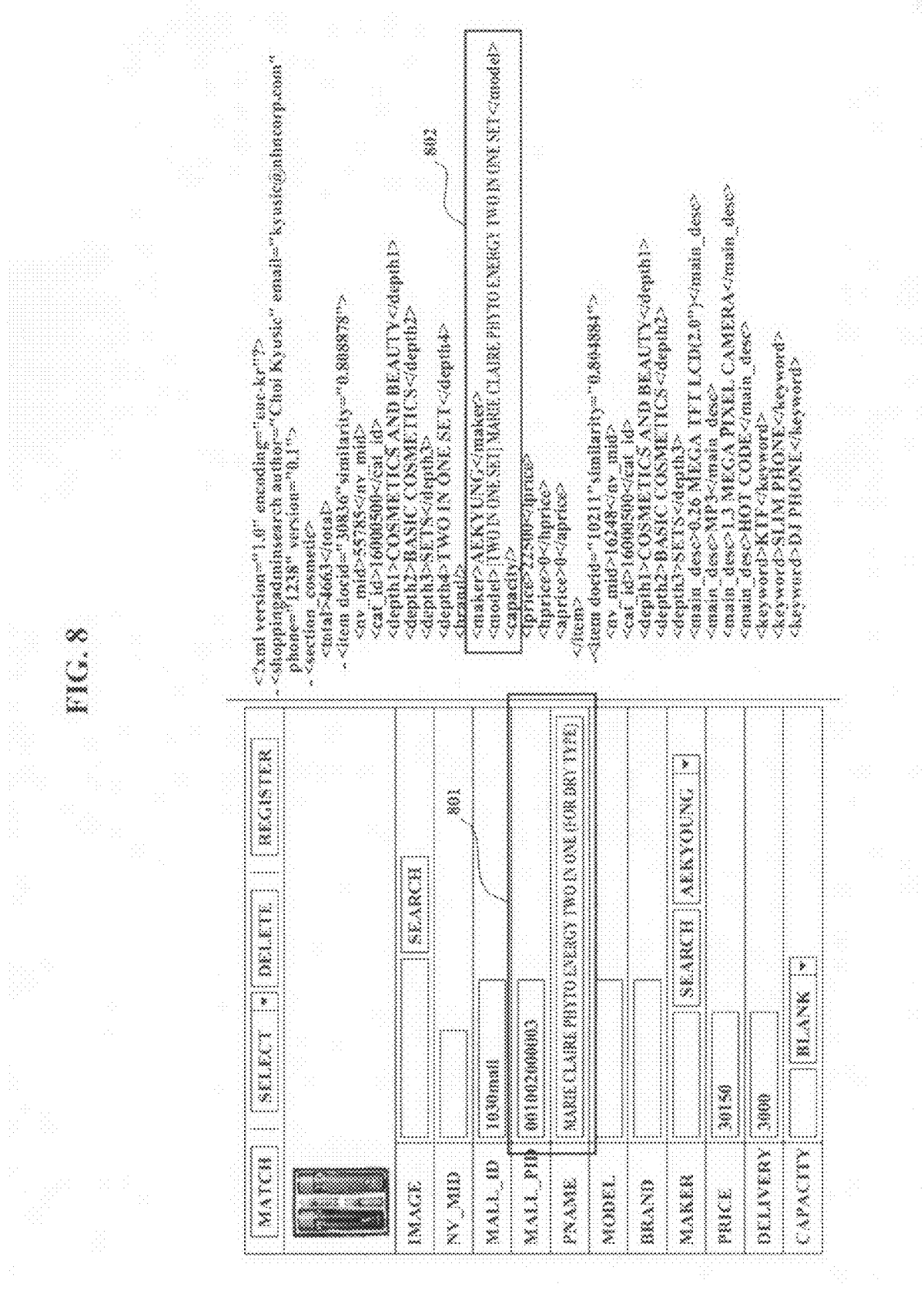

FIG. 8 illustrates still another example of a search result view which can be outputted by performing an automatic matching method according to an exemplary embodiment of the present invention.

As described above, a shopping mall relay server includes a general database search system, however, does not perform a search via a search engine. Accordingly, it is not easy to perform a search using a Hangul product name. Also, products, such as cosmetics, powered milk, and the like, generally include the Hangul product name and thus, it is difficult to output satisfactory search results.

However, according to one embodiment of the present invention, when performing a search with respect to the Hangul product name, a product name 801 corresponding to the original query is processed according to various search logics, as shown in FIG. 7, to perform a search and thus, a product model matching the product name 801 may be accurately retrieved and outputted as indicated by a reference numeral 802.

Hereinafter, an automatic matching method according to still another exemplary embodiment of the present invention will be described.

Figure 9:
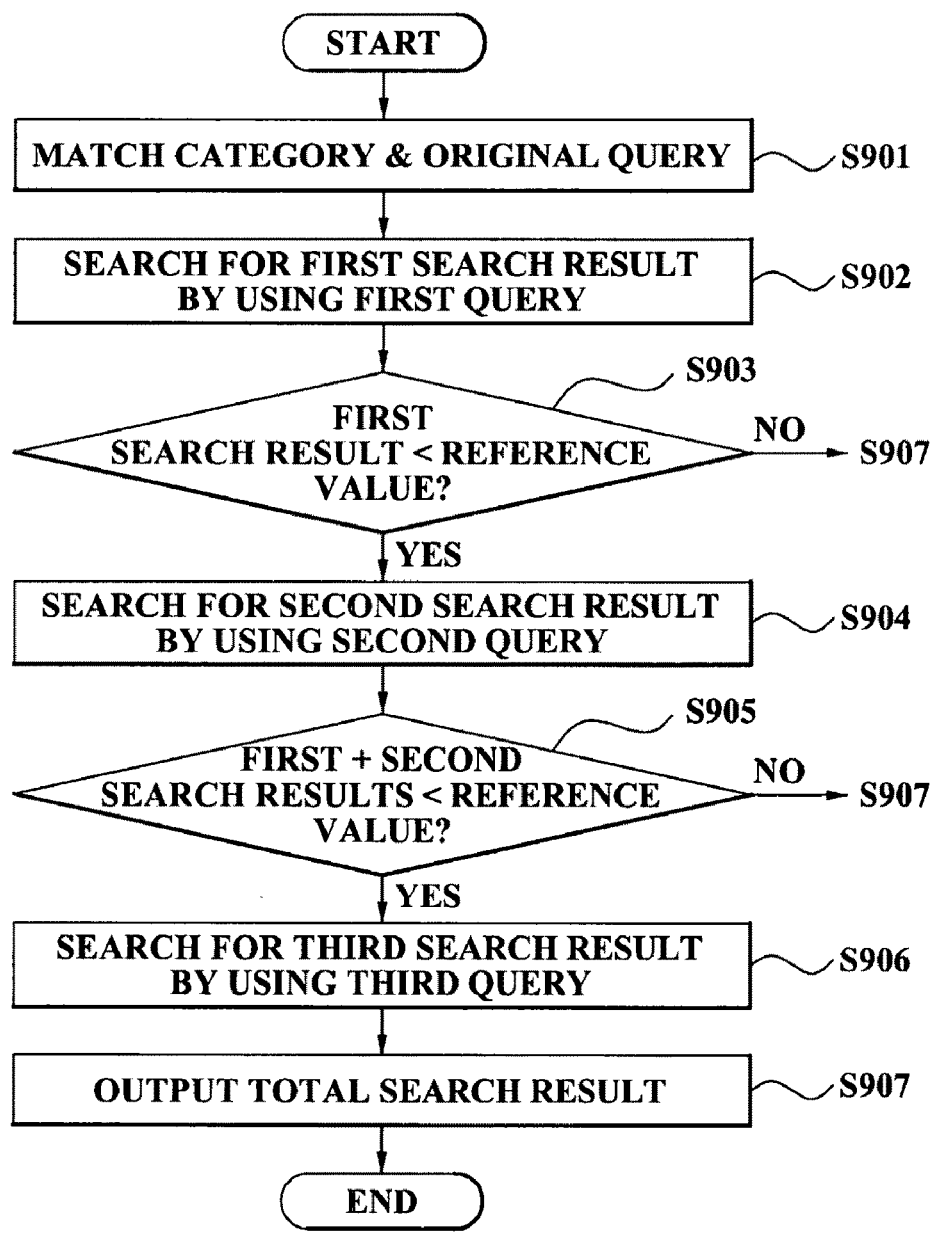
FIG. 9 is a flowchart illustrating an automatic matching method according to still another exemplary embodiment of the present invention.

FIG. 9 is a flowchart illustrating an automatic matching method according to still another exemplary embodiment of the present invention.

In operation S901, the automatic matching system matches a category and an original query. Operation S901 is a process of initially designating the category of the original query, and is similar or identical to operation S201 of FIG. 2 or operation S701 of FIG. 7 as described above. Accordingly, further detailed descriptions related thereto will be omitted. Automatic category matching with respect to the original query is performed prior to a query matching process. Accordingly, the automatic matching system may more accurately perform the query matching process within the designated category.

In operation S902, the automatic matching system searches a predetermined database for a first search result in the matched category by using a first query. In this instance, the first query is created by removing a space or a special character from the original query.

In operation S903, the automatic matching system determines whether a number of the first results is less than a predetermined reference value. When the number of first search results is determined to be not less than the predetermined reference value in operation S903, operation S907 is performed to output the first search result as a total search result. Conversely, when the number of first search results is determined to be less than the predetermined reference value in operation S903, operation S904 is performed.

In operation S904, the automatic matching system separates the original query into a plurality of words according to the space, and searches the database for a second search result in the matched category by using a second query. In this instance, the second query corresponds to a word each of which a first character and a last character includes either an alphabetic character or a numeral, and the word which includes at least one numeral, among the plurality of words.

In operation S905, the automatic matching system determines whether a sum of the number of first search results and a number of second search results is less than the reference value. When the sum of the number of first search results and the number of second search results is determined to be not less than the predetermined reference value in operation S905, operation S907 is performed to output the first search results and the second search result as a total search result. Conversely, when the sum of the number of first search results and the number of second search results is determined to be less than the predetermined reference value in operation S905, operation S906 is performed.

In operation S906, the automatic matching system creates a plurality of tokens by separating the second query using the space or the special character, and searches the database for a third search result in the matched category by using a third query. In this instance, the third query is created by connecting the plurality of tokens using the space.

In operation S907, the automatic matching system outputs at least one of the first search result, the second search result, and the third search result, as a total search result which matches the original query.

The automatic matching method according to the present exemplary embodiment may be performed by a predetermined product information registration system including the automatic matching system according to one embodiment of the present invention. Also, a search index, included in the database, may include a plurality of fields about a product model. In this instance, the product model may correspond to a product model categorized into luxury goods.

In the case of the product model, categorized into luxury goods, most product model names consist of a combination of alphabetic characters, numerals, and special characters, and Hangul is generally utilized to describe the product. Accordingly, when performing a search using the automatic matching method according to the present exemplary embodiment, very appropriate search results may be outputted.

Figure 10:
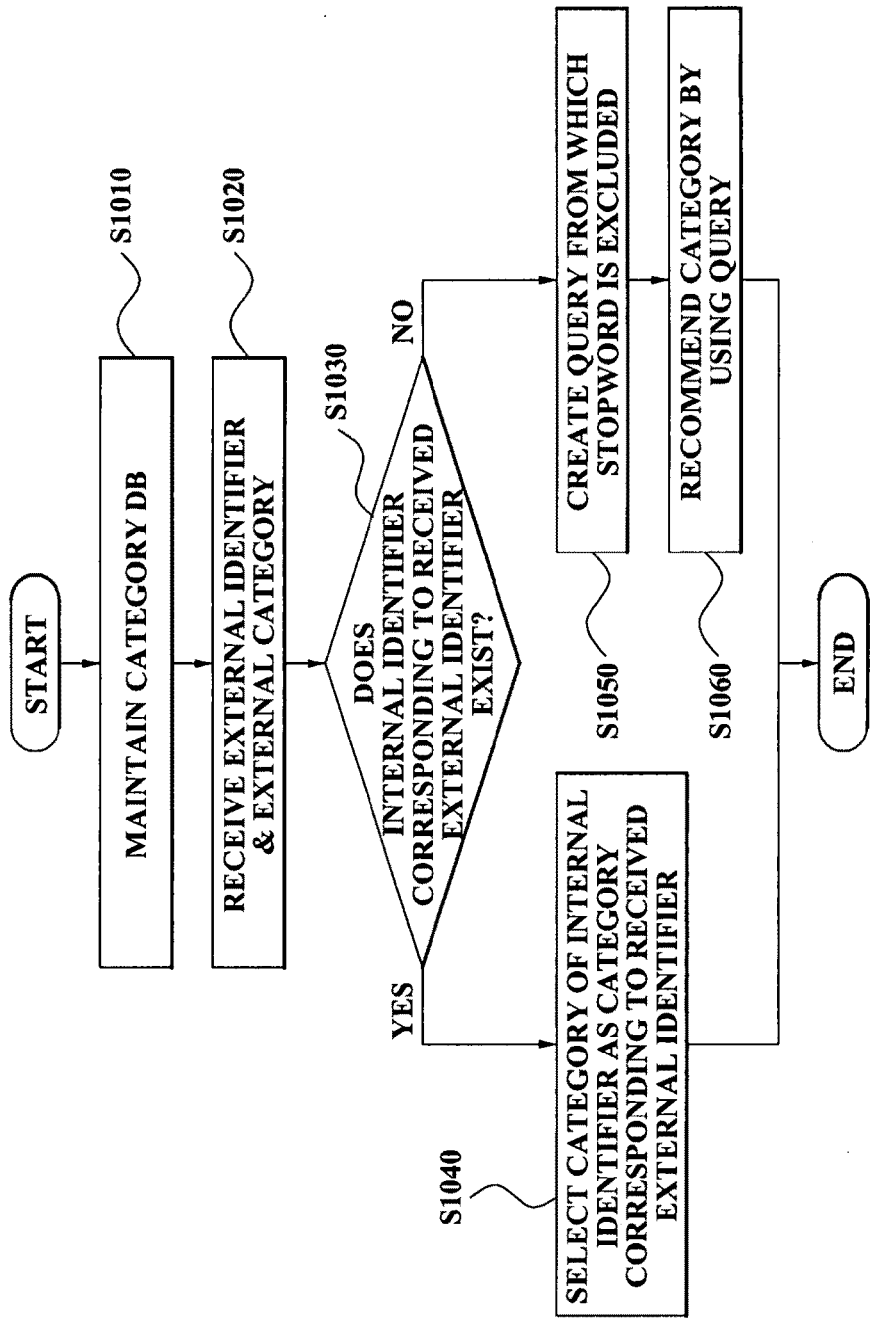
FIG. 10 is a flowchart illustrating an automatic matching method according to yet another exemplary embodiment of the present invention.

FIG. 10 is a flowchart illustrating an automatic matching method according to yet another exemplary embodiment of the present invention.

The automatic matching method according to the present exemplary embodiment may be performed by a predetermined automatic matching system. As described above, the automatic matching system may operate in a product relay server and a shopping mall server or may interoperate therewith.

Referring to FIG. 10, in operation S1010, the automatic matching system according to the present exemplary embodiment maintains a category database.

FIG. 11 illustrates an example of a category database according to an exemplary embodiment of the present invention.

As shown in FIG. 11, the category database may include an internal identifier 1101, an internal category 1102 including the internal identifier 1101, and a search field 1103. In this instance, the internal identifier 1101 is utilized in the product relay server 100 and the like.

The internal identifier 1101 may indicate, for example, a product identifier. Also, the internal identifier 1101 may indicate an identifier which is utilized to identify each of product models in the product relay server 100. Also, the internal category 1102 corresponds to a category which is categorized in the product relay server 100. Also, the internal category 1102 may indicate a category of the product relay server 100 including the internal identifier 1101. The internal category 1102 may be stored in a form of an identifier indicating a category. Also, the search field 1103 indicates a field to be searched when a recommendation category is retrieved using a query. The search field 1103 may include various types of information about each product model, such as a brand name, a model name, an item name, a keyword, and the like. Also, the search field 1103 may include category information. For example, the search field 1103 may include information about only the internal identifier 1101. Also, the search field 1103 may include information about both the internal identifier 1101 and the internal category 1102.

Referring to FIG. 11, the internal category 1102 is stored in the category database as a data field separate from the search field 1103. However, it is only an example and the present invention is not limited thereto. Specifically, the internal category 1102 may be included in the search field 1103, not in the form of the separate data field.

In operation S1020, the automatic matching system receives an external identifier and an external category, including the external identifier, from an outside.

For example, the external identifier may be a product identifier. The external identifier and the external category are utilized in the shopping mall server 110 in addition to the product relay server 100. In this instance, each of a plurality of shopping mall servers 110 may utilize a different identifier for the identical product, and may utilize a different category for the identical product. As described above, when categories of the plurality of shopping malls servers 110 are different from each other, the categories may not be registered in the product relay server 100. Accordingly, an appropriate category with respect to each of products needs to be set in the product relay server.

In operation S1030, the automatic matching system determines whether an internal identifier corresponding to the received external identifier exists.

Specifically, when both the external identifier and the internal identifier correspond to the product identifier, the automatic matching system determines whether the internal identifier corresponding to the external identifier received from the shopping mall server 110 is included in internal identifiers used in the product relay server 100.

In operation S1040, when the internal identifier corresponding to the received external identifier is included, the automatic matching system selects a category of the internal identifier as the category corresponding to the received external identifier.

In operation S1050, when the internal identifier corresponding to the received external identifier is excluded, the automatic matching system creates a query associated with the received external identifier. In this instance, the automatic matching system excludes a stopword from the external category or the external identifier, and creates a query using the external identifier or the external category from which the stopword is excluded. As described above, the stopword may indicate a keyword which has no direct relation to the product, however, is repeatedly included in the external identifier or the external category. In the present exemplary embodiment, examples of the stopword may include a bargain price, an ultra bargain price, and the like, which are included in a product name, corresponding to the external identifier, to promote sales of the product.

Specifically, the automatic matching system creates the query from which the stopword is excluded.

When creating the query, the automatic matching system may create the query by using only the external identifier. When creating the query using only the external identifier, the automatic matching system may reduce time spent to create the query.

Also, the automatic matching system may create the query by using the external identifier and the external category. When creating the query by using-the external identifier and the external category, the automatic matching system may effectively calculate a similarity between the external identifier and information stored in the category database. For example, when the external category includes a hierarchical structure formed of three stratums, the automatic matching system may create the query by using a bottom stratum, i.e. a third stratum, of the external category and the external identifier. For another example, the automatic matching system may create the query by using the entire stratums, i.e. first through third stratums, of the external category and the external identifier.

When creating the query, the automatic matching system may process the external identifier or the external category using various methods, and thereby create the query. For example, the automatic matching system may create the query by removing the space from the external identifier and/or the external category. Also, the automatic matching system may create the query by extracting a keyword from the external identifier and/or the external category for each spacing unit. Also, the automatic matching system may create the query by analyzing a morpheme of the external identifier and/or the external category. Also, the automatic matching system may create the query by sequentially performing a plurality of query creation methods until a predetermined condition is satisfied.

For example, although the query is created by removing the space from the external identifier and/or the external category, and a search for an internal identifier is performed by using the created query, desired search results may not be acquired. In this case, the automatic matching system may create the query by extracting a keyword from the external identifier and/or the external category for each spacing unit, and then search for the internal identifier using the created query. Also, when desired search results are not acquired by using the query, which is created by extracting the keyword for each spacing unit, the automatic matching system may create the query by analyzing a morpheme of the keyword, and then search for the internal identifier by using the created query.

In operation S1060, the automatic matching system recommends, by using the query, at least one of internal categories, stored in the category database, as a category corresponding to the external identifier.

In operation S1060, the automatic matching system may recommend only one most appropriate category. In this instance, the automatic matching system may automatically set the recommended category to the category corresponding to the external identifier.

Also, the automatic matching system may recommend a predetermined number of categories according to setting. In this instance, the automatic matching system may select any one of categories, recommended by the product registrant 120, as a recommendation category. The product registrant 120 registers the external identifier, such as the product identifier, and the like.

Specifically, in operation S1060, the automatic matching system may determine whether a prohibited word is included in the query, and may stop recommending of the category when the prohibited word is included in the query. As described above, the prohibited word is utilized to identify a product which is allowed for sales of the product. For example, a system operator may set a keyword, for example, 'condom', 'love gel', 'drug', and the like, associated with a product, which is against public mores or sales of the product is not allowed, as the prohibited word. Specifically, the automatic matching system may not perform automatic category matching with respect to the product which includes the prohibited word and is associated with creating of the query.

Figure 12:
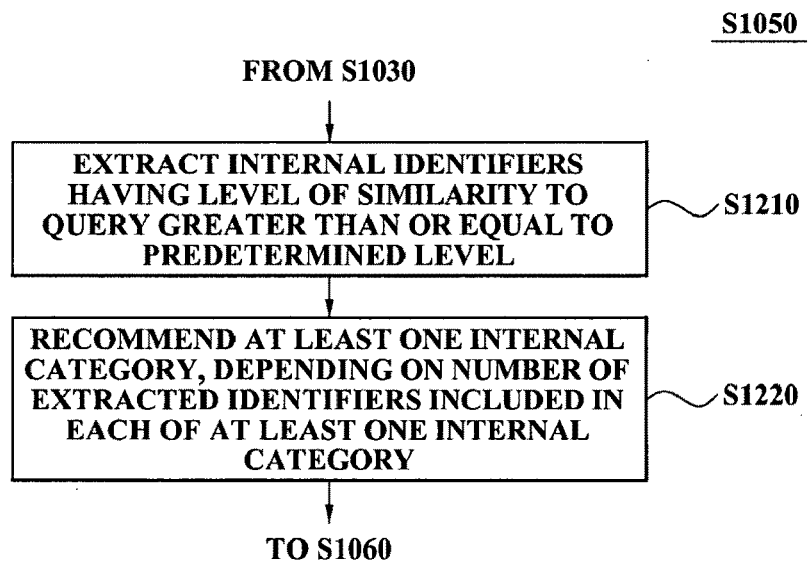
FIG. 12 is a flowchart illustrating an example of a category recommendation process according to an exemplary embodiment of the present invention.

FIG. 12 is a flowchart illustrating an example of a category recommendation process according to an exemplary embodiment of the present invention.

In operation S1210, the automatic matching system searches a category database using a query, and extracts internal identifiers having a level of similarity to the query greater than or equal to a predetermined level.

The automatic matching system may measure the similarity using various methods. For example, the automatic matching system may measure the similarity by applying 'Optimizing the Weight of Added Terms in Query Expansion', disclosed in pages 241 through 246 of the Ninth Science Conference of the Korean Association of Information Management.

In operation S1210, the automatic matching system may extract internal identifiers having the similarity greater than or equal to 0.4.

Also, in operation S1210, the automatic matching system may extract internal identifiers of which prices are within a predetermined range from a price corresponding to the external identifier. For example, when the price corresponding to the external identifier is 5,900 won, the automatic matching system may extract identifiers of which prices are within the range from 4,700 won to 7,080 won (price range ±20%). Generally, similar products in an identical or similar category have a similar price zone. Therefore, in the present exemplary embodiment, the price zone is limited and thus the automatic matching system may quickly and readily extract internal identifiers having a greater relation to the external identifier.

In operation S1220, the automatic matching system recommends the at least one internal category, as the category corresponding to the external identifier, depending on a number of the extracted identifiers included in each of the at least one internal category.

Figure 13:
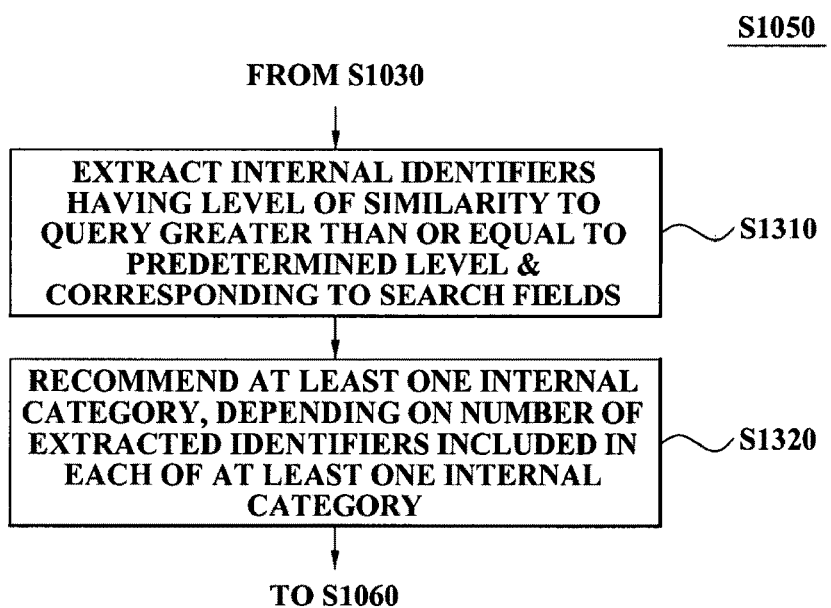
FIG. 13 is a flowchart illustrating another example of a category recommendation process according to an exemplary embodiment of the present invention.

FIG. 13 is a flowchart illustrating another example of a category recommendation process according to an exemplary embodiment of the present invention.

In FIG. 13, a category database includes a search field which is created by using an internal identifier and an internal category.

Referring to FIG. 13, in operation S1310, the automatic matching system searches a database using a created query, and extracts internal identifiers from the category database. In this instance, the internal identifiers have a level of similarity to the query greater than or equal to a predetermined level, and corresponding to the search fields.

As described above, the automatic matching system may extract the internal identifiers based on the similarity between the created search field and the created query, and thereby recommend a more appropriate category for the external identifier.

In this instance, the automatic matching system may measure the similarity using various methods. For example, the automatic matching system may extract internal identifier having greater than or equal to 0.4 of similarity between the search field and the query.

When extracting the internal identifiers, the automatic matching system may extract only the internal identifiers of which prices are within a predetermined range from a price corresponding to the external identifier.

In operation S1320, the automatic matching system recommends the at least one internal category, as the category corresponding to the external identifier, depending on a number of the extracted identifiers included in each of the at least one internal category.

When recommending the category in operation S1030 of FIG. 10, the automatic matching system may create the query using a different scheme according to a server transmitting the external identifier and the external category. Specifically, when the external identifier is a product identifier, and the server transmitting the external identifier and the external category is a shopping mall server, the automatic matching system may create the query using a different scheme for each of shopping malls. For example, the automatic matching system may create the query using only the product identifier, corresponding to the external identifier, for a shopping mall server A, may create the query by using a bottom stratum of the external category and the product identifier, corresponding to the external identifier, for a shopping mall server B, and may create the query by using the entire external category and the product identifier for a shopping mall C. Accordingly, the automatic matching system may more effectively recommend a category by setting an appropriate query creation method according to characteristics of the server transmitting the external identifier and the external category.

When recommending the category in operation S1060 of FIG. 10, the automatic matching system may change a similarity calculation target for the query according to the server transmitting the external identifier and the external category. For example, the automatic matching system may create the internal identifier based on the similarity between the query and the internal identifier for the shopping mall server A. Also, the automatic matching system may create the internal identifier based on the similarity between the query and the search field, which is created by using the internal identifier and the internal category, for the shopping mall server B.

FIG. 14 illustrates an example of a view where internal identifiers are counted for each internal category using a query according to an exemplary embodiment of the present invention.

In FIG. 14, to register a product, an external identifier 1410 'sale food trash bin (cute design)/cleanness on your sink/hot sale food trash bin' and an external category 1420 'openmarket@living/health@living/bathroom@cleaning/washing' are received from an external shopping mall site 'interpark'.

In this instance, the automatic matching system excludes a stopword from the received external identifier or the external category. Specifically, the automatic matching system may exclude the stopword from the external identifier or the external category, and accurately match a category with the product requested for registration. In this instance, the stopword corresponds to keywords set by a system operator, such as 'sale', 'hot sale', and the like. The automatic matching system creates the query by using the external identifier 1410 'sale food trash bin (cute design)/cleanness on your sink/hot sale food trash bin', from which the stopword is excluded, and the external category 1420 'openmarket@living/health@living/bathroom@cleaning/washing'.

When creating the query, the automatic matching system may create a query 1431 'food trash bin cute design cleanness on your sink food trash bin' by using only the external identifier 1410 'sale food trash bin (cute design)/cleanness on your sink/hot sale food trash bin' from which the stopword is excluded. Referring to search results 1441 where internal identifiers are extracted for each internal category, based on the created query 1431, the automatic matching system counted four internal identifiers having a level of similarity to the query 1431 greater than or equal to 0.4.

Accordingly, with respect to the query 1431 'food trash bin cute design cleanness on your sink food trash bin', the automatic matching system recommends 'living/kitchen@kitchenutensils@kitchenitems@foodtrashbin' of a category identifier '07020404 where internal identifiers are most counted, as the category corresponding to the external identifier.

Also, the automatic matching system may create a query 1432 'cleaning washing food trash bin cute design cleanness on your sink food trash bin' by using an external identifier 'food trash bin (cute design)/cleanness on your sink/food trash bin' from which the stop word is excluded, and a bottom stratum 'cleaning/washing' of the external category. Referring to search results 1442 where internal identifiers are extracted for each internal category, based on the created query 1432, the automatic matching system i) counted 409 internal identifiers having a level of similarity to the query 1432 greater than or equal to 0.4 in an internal category of a category identifier '07050003', 2) counted 237 internal identifiers having the level of similarity to the query 1432 greater than or equal to 0.4 in an internal category of a category identifier '02041000', and iii) counted 111 internal identifiers having the level of similarity to the query 1432 greater than or equal to 0.4 in an internal category of a category identifier '00030700'.

Accordingly, with respect to the query 1432 'cleaning washing food trash bin cute design cleanness on your sink food trash bin', the automatic matching system recommends 'living/kitchen@washing/cleaningsupplies@cleaningsupplies@bin/trashbin' of the category identifier '07050003' where internal identifiers are most counted, as the category corresponding to the external identifier.

Also, the automatic matching system may create a query 1433 'open market living health living bathroom cleaning washing food trash bin cute design cleanness on your sink food trash bin' by using an external identifier 'food trash bin (cute design)/cleanness on your sink/food trash bin' from which the stop word is excluded, and the external category 1420 'openmarket@living/health@living/bathroom@cleaning/washing'. Referring to search results 1443 where internal identifiers are extracted for each internal category, based on the created query 1443, the automatic matching system i) counted 409 internal identifiers having a level of similarity to the query 1433 greater than or equal to 0.4 in an internal category of a category identifier '07050003', 2) counted 322 internal identifiers having the level of similarity to the query 1433 greater than or equal to 0.4 in an internal category of a category identifier '02041000', and iii) counted 252 internal identifiers having the level 0.4 of similarity to the query 1433 greater than or equal to in an internal category of a category identifier '11010505'.

Accordingly, with respect to the query 1433 'openmarket living health living bathroom cleaning washing food trash bin cute design cleanness on your sink food trash bin', the automatic matching system recommends 'living/kitchen@washing/cleaningsupplies@cleaningsupplies@bin/trashbin' of the category identifier '07050003' where internal identifiers are most counted, as the category corresponding to the external identifier.

As described above, the automatic matching system according to one embodiment of the present invention may accurately match a category with a registration requested product, based on a query which is created by an external category or an external identifier form which a stopword is excluded.

According to another exemplary embodiment of the present invention, the automatic matching system may determine whether a prohibited word is included in a query and then stop recommending of a category when the prohibited word is included in the query. For example, when the prohibited word, for example, 'condom', 'love gel', 'drug', and the like, is included in the created query, the category matching system may generate a registration refusal signal and then stop recommending of the category. In this instance, the registration refusal signal is associated with refusing to intermediate sales of a corresponding product.

Figure 15:
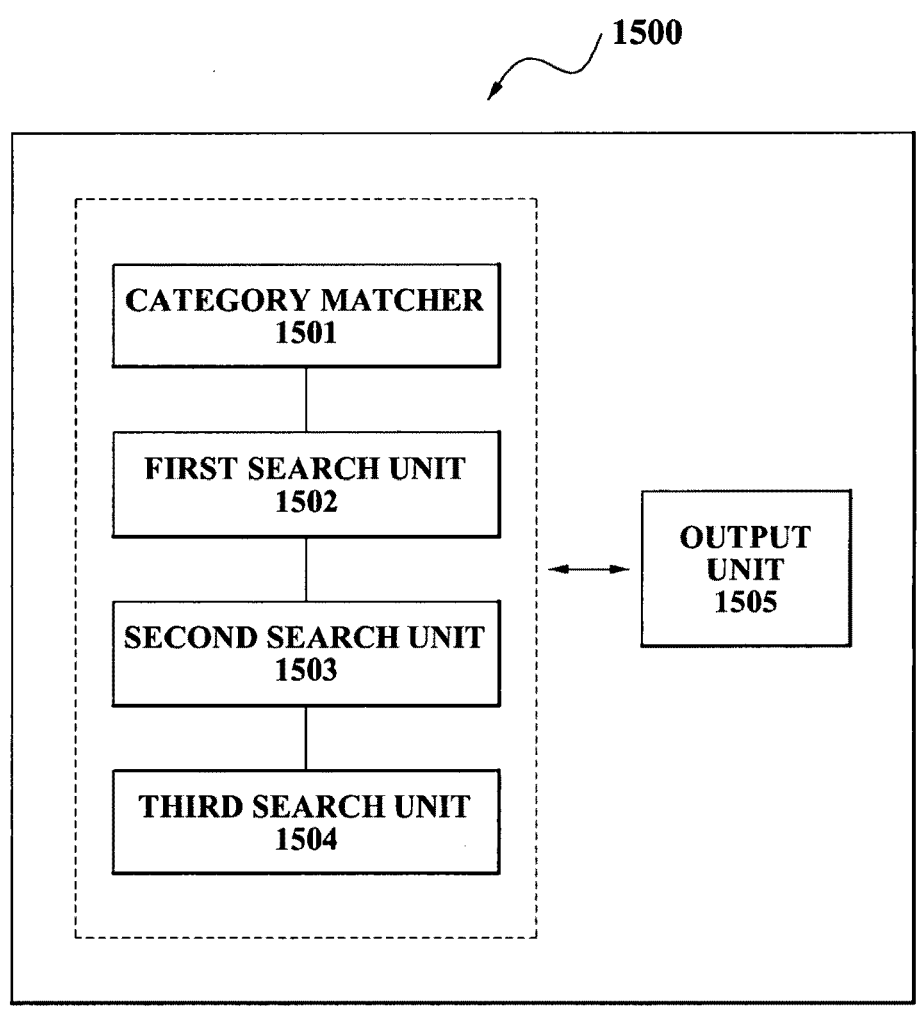
FIG. 15 is a block diagram illustrating a configuration of an automatic matching system according to an exemplary embodiment of the present invention.

FIG. 15 is a block diagram illustrating a configuration of an automatic matching system 1500 according to an exemplary embodiment of the present invention. The automatic matching system 1500 according to the present exemplary embodiment may perform a search process with respect to a predetermined database including a search index.

As shown in FIG. 15, the automatic matching system 1500 includes a category matcher 1501, a first search unit 1502, a second search unit 1503, a third search unit 1504, and an output unit 1505.

The category matcher 1501 functions to match a category and an original query.

Figure 16:
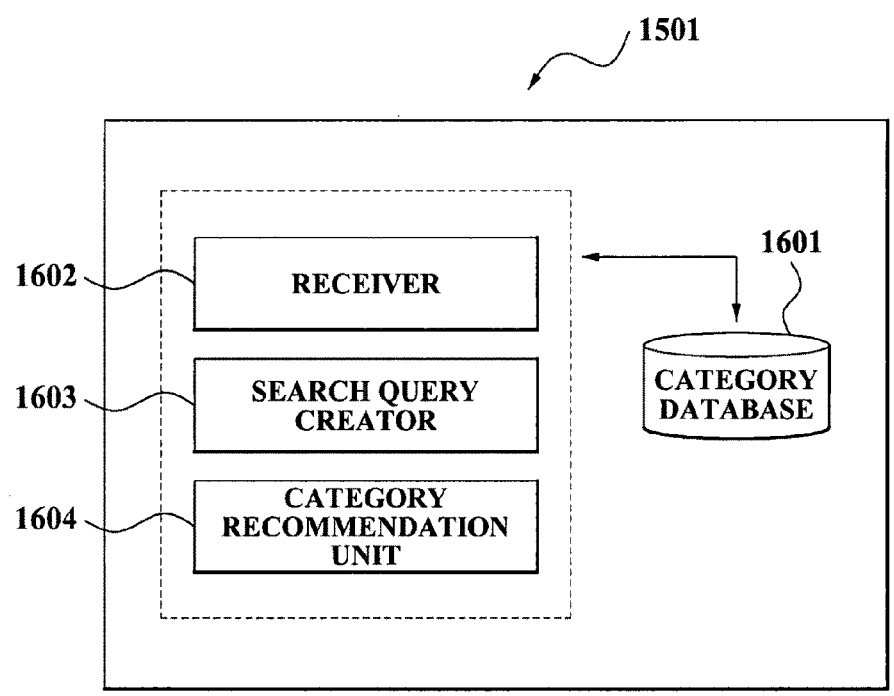
FIG. 16 is a block diagram illustrating a configuration of a category matcher according to an exemplary embodiment of the present invention.

FIG. 16 is a block diagram illustrating a configuration of the category matcher 1501 according to an exemplary embodiment of the present invention.

Referring to FIG. 16, the category matcher 1501 according to the present exemplary embodiment includes a category database 1601, a receiver 1602, a search query creator 1603, and a category recommendation unit 1604.

The category database 1601 includes an internal identifier and an internal category including the internal identifier. In this instance, the internal identifier and the internal category may be defined as an identifier and a category which are used in a predetermined server.

The receiver 1602 receives an original query and an original category including the original query from an outside, in association with a registration request for a product.

For example, the receiver 1602 may receive the original query and the original category from a shopping mall server.

The search query creator 1603 creates a search query associated with the original query.

When creating the search query, the search query creator 1603 may create the search query by using only the original query. When creating the search query by using only the original query, the search query creator 1603 may reduce time spent to create the search query. Also, the search query creator 1603 may create the search query by using the original query and the original category. For example, when the original category includes a hierarchical structure formed of three stratums, the search query creator 1603 may create the search query by using a bottom stratum of the original category and the original query. For another example, when the original category includes a hierarchical structure formed of three stratums, the search query creator 1603 may create the search query by using the entire stratums of the original category and the original query.

When creating the search query, the search query creator 1603 may process the original query or the original category using various methods, and thereby create the search query. For example, the search query creator 1603 may create the search query by removing the space from the original query and/or the original category. Also, the search query creator 1603 may create the search query by extracting a keyword from the original query and/or the original category for each spacing unit. Also, the search query creator 1603 may create the search query by analyzing a morpheme of the original query and/or the original category. Also, the search query creator 1603 may create the search query by sequentially performing a plurality of search query creation methods until a predetermined condition is satisfied.

For example, although the search query is created by removing the space from the original query and/or the original category, and a search for an internal identifier is performed by using the created search query, desired search results may not be acquired. In this case, the search query creator 1603 may create the search query by extracting a keyword from the original query and/or the original category for each spacing unit, and then search for the internal identifier using the created search query. Also, when desired search results are not acquired by using the search query, which is created by extracting the keyword for each spacing unit, the search query creator 1603 may create the search query by analyzing a morpheme of the keyword, and then search for the internal identifier by using the created search query.

The category recommendation unit 1604 recommends, by using the created search query, at least one of internal categories, stored in the category database 1601, as a category corresponding to the original query.

When recommending the category, the category recommendation unit 1604 may recommend only one most appropriate category. In this instance, the category recommendation unit 1604 may automatically set the recommended category to the category corresponding to the received original query.

Also, the category recommendation unit 1604 may recommend a plurality of categories according to setting.

Also, the category recommendation unit 1604 may search the category database 1601 using the search query, and extract internal identifiers, having a level of similarity to the search query greater than or equal to a predetermined level, from the category database 1601 by using the search query, and then recommend at least one internal category, as the category corresponding to the original query, depending upon a number of the extracted internal identifiers included in each of the at least one internal category. Also, the category recommendation unit 1604 may extract only internal identifiers of which prices are between an upper limit and a lower limit of a predetermined range from a price corresponding to the original query.

The first search unit 1502 searches a predetermined database for a first search result in the matched category by using a first query. In this instance, the first query is created by removing a space or a special character from the original query.

For example, the first search unit 1502 may create the first query by removing 'blank', '/', '−', and '+', from the original query, and search the matched category for the first search result including the first query.

The second search unit 1503 separates the original query into a plurality of words according to the space, and searches the database for a second search result in the matched category by using a second query when a number of the first search results is less than a predetermined reference value. In this instance, the second query is created by including any one or a combination of alphabetic characters, numerals, and special characters among the plurality of words.

For example, the second search unit 1503 may separate the original query by 'blank', and create words consisting of only alphabetic characters, numerals, '/', '−', and '+', as the second query. Also, the automatic matching system may search the matched category for the second search result by using the created second query. The described process is performed with assumption that English words have more important meaning. According to the assumption, words determined to be unnecessary for searching the database may be removed.

The third search unit 1504 searches the database for a third search result in the matched category by using a third query when a sum of the number of the first search results and the number of second search results is less than the reference value. In this instance, the third value corresponds to a word of which a first character includes an alphabetic character, and of which a last character includes either an alphabetic character or a numeral, and which includes at least one numeral, among the second query.

In this instance, the third search unit 1504 sorts a plurality of third queries in a descending order according to a length of each of the third queries. Also, the third search unit 1504 searches the matched category for the third search result according to the sorted order.

Also, the third search unit 1504 may perform operations S301 through S308 as shown in FIG. 3.

The output unit 1505 outputs at least one of the first search result, the second search result, and the third search result, as a total search result which matches the original query.

Also, the automatic matching system 1500 according to the present exemplary embodiment may be included in a predetermined information registration system and thereby operate. A search index, included in the database, may include a plurality of search fields about a product model. In this instance, the product model may correspond to a product model categorized into electronics/computers. In the case of the product model, categorized into electronics/computers, most product model names consist of a combination of alphabetic characters, numerals, and special characters, and Hangul is generally utilized to describe the product. Accordingly, when performing a search via the automatic matching system 1500 according to the present exemplary embodiment, very appropriate search results may be outputted.

Hereinafter, the automatic matching system 1500 according to another exemplary embodiment of the present invention will be described.

The automatic matching system 1500 according to the present exemplary embodiment may perform a search with respect to a predetermined database including a search index. As shown in FIG. 15, the automatic matching system 1500 includes the first search unit 1502, the second search unit 1503, the third search unit 1504, and the output unit 1505.

The category matcher 1501 matches a category and an original query.

The first search unit 1502 searches a predetermined database for a first search result in the matched category by using a first query. In this instance, the first query is created by removing a space or a special character from the original query.

The second search unit 1503 searches the database for a second search result in the matched category by using a second query when a number of the first search results is less than a predetermined reference value. In this instance, the second query is created by separating the original query into a plurality of words according to the space.

The third search unit 1504 searches the database for a third search result in the matched category by using a third query when a sum of the number of the first search results and a number of the second search results is less than the reference value. In this instance, the third query is created by analyzing a morpheme of the original query.

The output unit 1505 outputs at least one of the first search result, the second search result, and the third search result, as a total search result which matches the original query.

The automatic matching system 1500 according to the present exemplary embodiment may be included in a predetermined product information registration system and thereby operate. Also, a search index, included in the database, may include a plurality of search fields about a product model. In this instance, the product model may correspond to a product model categorized into cosmetics, powered milk, diapers, and other products. In the case of the product model, categorized into cosmetics, powered milk, diapers, and other products, most product model names consist of Hangul. Accordingly, when performing a search via the automatic matching system 1500 according to the present exemplary embodiment rather than the above-described exemplary embodiment, more appropriate search results may be outputted.

Hereinafter, an automatic matching system according to still another exemplary embodiment of the present invention will be described with reference again to FIG. 15.

The automatic matching system 1500 according to the present exemplary embodiment may perform a search with respect to a predetermined database including a search index.

As shown in FIG. 15, the automatic matching system 1500 according to the present exemplary embodiment includes the category matcher 1501, the first search unit 1502, the second search unit 1503, the third search unit 1504, and the output unit 1505.

The category matcher 1501 matches a category and an original query.

The first search unit 1502 searches a predetermined database for a first search result in the matched category by using a first query. In this instance, the first query is created by removing a space or a special character from the original query.

For example, the first search unit 1502 may create the first query by removing 'blank', '/', '–', and '+', from the original query, and search the matched category for the first search result including the first query.

The second search unit 1503 separates the original query into a plurality of words according to the space, and searches the database for a second search result in the matched category by using a second query when a number of the first search results is less than a predetermined reference value. In this instance, the second query corresponds to a word each of which a first character and a last character includes either an alphabetic character or a numeral, and the word which includes at least one numeral, among the plurality of words.

For example, when the original query is "Tag Heuher sunglasses [1000002538]", the second search unit 1503 may perform a search by determining '1000002538' as the second query.

For another example, when the original query is "[6 monthly installments without interest] Ferragamo bracelet [34-2821_esp]", the second search unit 1503 may perform a search by determining '34-2821_esp' as the second query.

In this instance, the second search unit 1503 sorts a plurality of third queries in a descending order according to a length of each of the third queries. Also, the second search unit 1503 searches the matched category for the third search result according to the sorted order.

The third search unit 1504 creates a plurality of tokens by separating the second query using the space or the special character, and searches the database for a third search result in the matched category by using a third query when a sum of the number of the first search results and a number of the second search results is less than the reference value. In this instance, the third query is created by connecting the plurality of tokens using the space.

For example, the third search unit 1504 may create the plurality of tokens by separating the second query using '/', '–', '+', '_', '.', and the like. Also, the third search unit 1504 may create the third search result through a process of repeatedly searching the database while reducing a number of the tokens, included in the third query, from a latter part of the third query.

For example, when the third query is "34-2821_esp", the third search unit 1504 may repeatedly search the database in an order of '34 2821 esp', '34 2821', and '34'.

The output unit 1504 outputs at least one of the first search result, the second search result, and the third search result, as the total search result which matches the original query.

The automatic matching system 1500 according to the present exemplary embodiment may be included in a predetermined product information registration system and thereby operate. Also, a search index, included in the database, may include a plurality of search fields about a product model. In this instance, the product model may correspond to a product model categorized into luxury goods. In the case of the product model, categorized into luxury goods, most product model names consist of a combination of alphabetic characters, numerals, and special characters, and Hangul is generally utilized to describe the product. Accordingly, when performing a search via the automatic matching system 1500 according to the present exemplary embodiment, very appropriate search results may be outputted.

Figure 17:
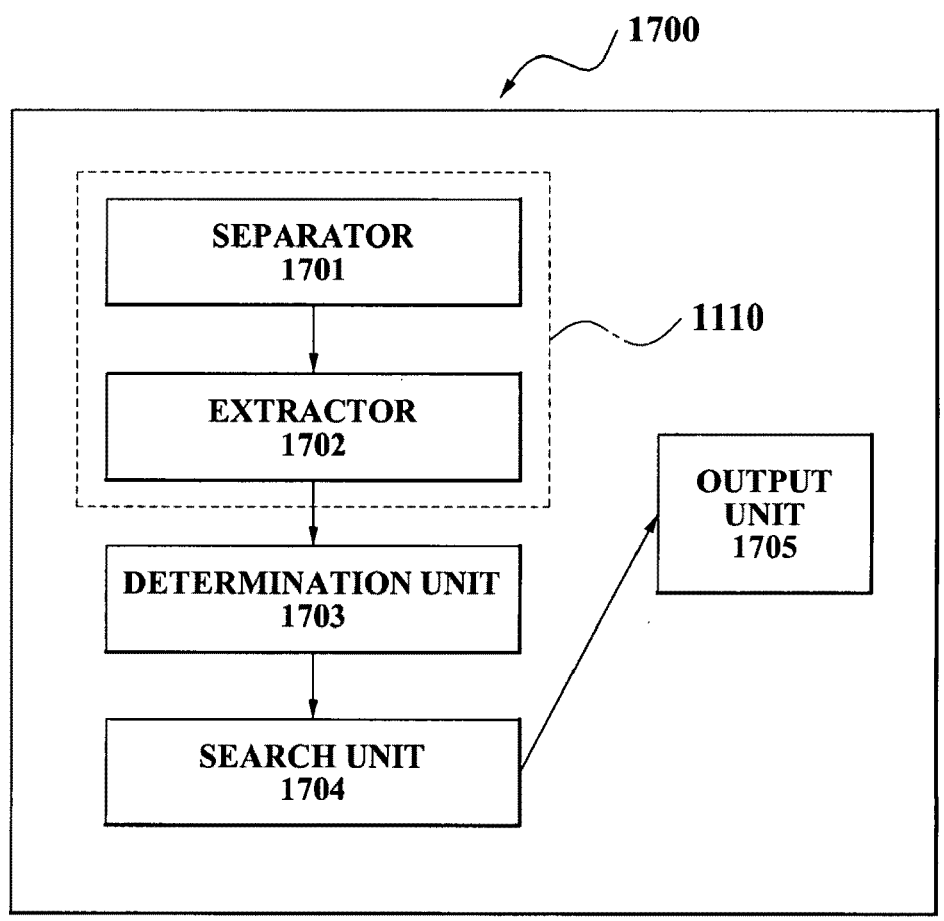
FIG. 17 is a block diagram illustrating a configuration of an automatic matching system according to another exemplary embodiment of the present invention.

FIG. 17 is a block diagram illustrating a configuration of an automatic matching system 1700 according to another exemplary embodiment of the present invention.

The automatic matching system 1700 according to the present exemplary embodiment may perform a search with respect to a predetermined database including a search index. The automatic matching system 1700 includes a separator 1701, a determination unit 1703, a search unit 1704, and an output unit 1705 among configuration elements as shown in FIG. 17.

The separator 1701 separates an original query into a plurality of words according to space.

The determination unit 1703 determines a word consisting of any one or a combination of at least two of alphabetic characters, numerals, and character strings, as a search query, among the plurality of words.

The search unit 1704 searches the database for a search result using the search query.

The output unit 1705 outputs the search result as a search result which matches the original query.

Hereinafter, an automatic matching system according to another exemplary embodiment of the present invention will be described with reference again to FIG. 17.

The automatic matching system 1700 according to the present exemplary embodiment may perform a search with respect to a predetermined database including a search index. As shown in FIG. 17, the automatic matching system 1700 includes the separator 1701, an extractor 1702, the determination unit 1703, the search unit 1704, and the output unit 1705.

The separator 1701 separates an original query into a plurality of words according to space.

The extractor 1702 extracts a word, consisting of any one or a combination of at least two of alphabetic characters, numerals, and special characters, from the plurality of words.

The determination unit 1703 determines a word each of which a first character and a last character includes either an alphabetical character or a numeral, and the word which includes at least one numeral, as the search query.

The search unit 1704 searches the database for a search result using the search query.

The output unit 1705 outputs the search result as a search result which matches the original query.

Hereinafter, an automatic matching system according to still another exemplary embodiment of the present invention will be described with reference again to FIG. 17.

The automatic matching system 1700 according to the present exemplary embodiment may perform a search with respect to a predetermined database including a search index. As shown in FIG. 17, the automatic matching system 1700 includes a token creator 1110, the determination unit 1703, the search unit 1704, and the output unit 1705. The token creator 1110 includes the separator 1701 and the extractor 1702.

The token creator 1110 creates a plurality of tokens by processing the original query according to a predetermined separation logic.

The token creator 1110 may include the separator 1701 and the extractor 1702. The separator 1701 separates the original query into a plurality of words according to space, and the extractor 1702 extracts a word, consisting of any one or a combination of at least two of alphabetic characters, and special characters, from the plurality of words.

The determination unit 1703 determines a search query by connecting the plurality of tokens using the space.

The search unit 1704 repeatedly searches the database for a search result while reducing a number of the tokens, included in the search query, from a latter part of the search query.

The output unit 1705 outputs the retrieved search result as a search result which matches the original query.

Figure 18:
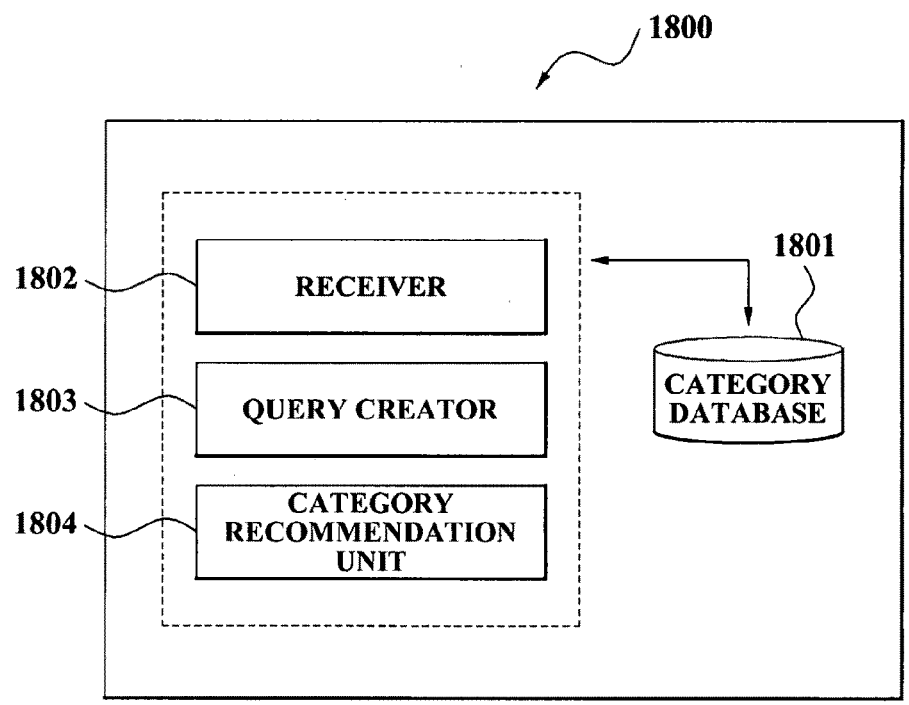
FIG. 18 is a block diagram illustrating a configuration of an automatic matching system according to still another exemplary embodiment of the present invention.

FIG. 18 is a block diagram illustrating a configuration of an automatic matching system 1800 according to still another exemplary embodiment of the present invention.

Referring to FIG. 18, the automatic matching system 1800 according to the present exemplary embodiment includes a category database 1801, a receiver 1802, a query creator 1803, and a category recommendation unit 1804.

The category database 1801 includes an internal identifier and an internal category including the internal category. In this instance, the internal identifier and the internal category correspond to an identifier and a category which are utilized in a predetermined product relay server, and is different from an identifier and a category which are utilized in a shopping mall server by an external identifier and an external category. In this instance, the external identifier/internal identifier utilized to identify a product, a multimedia file, knowledge, news, and the like, and may include a product name, a file name, a knowledge keyword, a news title, and the like.

As described above with reference to FIG. 11, the category database 1801 may further include a search field. Also, the internal category may be stored in a form of an identifier indicating a category. The search field indicates a field to be searched when a recommendation category is retrieved using a query. Also, the search field may include various types of information associated with a product model, such as a brand name, a model name, an item name, a keyword, and the like. Also, the search field may include category information. For example, the search field may include information about only the internal identifier. Also, the search field may include information about both the internal identifier and the internal category.

The receiver 1802 receives an external identifier and an external category including the external identifier, from an outside, in association with a registration request for a product.

For example, the receiver 1802 may receive the external identifier and the external category from a shopping mall server.

The query creator 1803 creates a query associated with the external identifier. Particularly, in the present exemplary embodiment, the query creator 1803 excludes a stopword from the external category or the external category, and creates a query using the external identifier or the external category from which the stopword is excluded.

When creating the query, the query creator 1803 may create the query by using only the external identifier from which the stopword is excluded. When creating the query by using only the external identifier, the query creator 1803 may reduce time spent to create the query. Also, the query creator 1803 may create the query by using the external identifier and the external category. For example, when the external category includes a hierarchical structure formed of three stratums, the query creator 1803 may create the query by using the external identifier and a bottom stratum of the external category. For another example, when the external category includes a hierarchical structure formed of three stratums, the query creator 1803 may create the query by using the external identifier and the entire stratums of the external category.

When creating the query, the query creator 1803 may process the external identifier or the external category using various methods, and thereby create the query. For example, the query creator 1803 may create the query by removing the space from the external identifier and/or the external category. Also, the query creator 1803 may create the query by extracting a keyword from the external identifier and/or the external category for each spacing unit. Also, the query creator 1803 may create the query by analyzing a morpheme of the external identifier and/or the external category. Also, the query creator 1803 may create the query by sequentially performing a plurality of query creation methods until a predetermined condition is satisfied.

For example, although the query is created by removing the space from the external identifier and/or the external category, and a search for an internal identifier is performed by using the created query, desired search results may not be acquired. In this case, the query creator 1803 may create the query by extracting a keyword from the external identifier and/or the external category for each spacing unit, and then search for the internal identifier using the created query. Also, when desired search results are not acquired by using the query, which is created by extracting the keyword for each spacing unit, the query creator 1803 may create the query by analyzing a morpheme of the keyword, and then search for the internal identifier by using the created query.

The category recommendation unit 1804 recommends, by using the created query, at least one of internal categories, stored in the category database 1801, as the category corresponding to the external identifier.

When recommending the category, the category recommendation unit 1804 may recommend only one most appropriate category. In this instance, the category recommendation unit 1804 may automatically set the recommended category to the category corresponding to the received external identifier.

Also, the category recommendation unit 1804 may recommend a plurality of categories according to setting. In this instance, the category recommendation unit 1804 may select one of categories, recommended by a product registrant, as a recommendation category. The product registrant registers an external identifier of the product identifier.

Particularly, in one embodiment of the present invention, the category recommendation unit 1804 stops recommending of the category with respect to a query including a keyword which is set to a prohibited word. Accordingly, it is possible to control a product, which is against public mores or inappropriate for characteristics of a product relay server, to be not sold.

The category recommendation unit 1804 may operate according to an operational flow described with reference to FIGS. 12 and 13.

Specifically, the category recommendation unit 1804 may search the category database 1801 using the query, and extract internal identifiers having a level of similarity to the query greater than or equal to a predetermined level from the category database 1801 by using the query, and then recommend at least one internal category, as the category corresponding to the external identifier, depending upon a number of the extracted internal identifiers included in each of the at least one internal category. Also, the category recommendation unit 1804 may extract only internal identifiers of which prices are between an upper limit and a lower limit of a predetermined range from a price corresponding to the external identifier.

The automatic matching method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to one embodiment of the pre sent invention, there is provided an automatic matching method and system which can automatically match a category and an original query prior to matching a query and thereby can more exactly match the query within a designated category.

Also, according to one embodiment of the present invention, there is provided an automatic matching method and system which can outperform a database search method of providing only search results which accurately include an original query, and thereby can output a predetermined number of search results that may match the original query by processing the original query via a plurality of processes according to various search logics on the original query and.

Also, according to one embodiment of the present invention, there is provided an automatic matching method and system which can automate product registration/matching operations when loading product information registered in a shopping mall server and registering product information in a shopping mall relay server, and thereby can significantly reduce limitation of the operation resources.

Also, according to one embodiment of the present invention, there is provided an automatic matching method and system which can effectively retrieve a product model having high probability of matching a corresponding query, by applying a different search logic according to a property of the product corresponding to each query.

Also, according to one embodiment of the present invention, there is provided an automatic matching method and system which can extract a suitable query from an original query, which is a product name that a product registrant enters into a shopping mall server, and retrieve a product model matching a corresponding product using the extracted query, and thereby can pre-perform product registration/matching operations when the product registrant registers a product in the shopping mall server, and does not need an additional manual operation for the product registration/matching when registering the product in a shopping mall relay server.

Also, according to one embodiment of the present invention, there is provided an automatic matching method and system which can recommend a category of a product based on a query from which a stopword is excluded, and thereby can reduce a matching error and exactly match a category and the query.

Also, according to one embodiment of the present invention, there is provided an automatic matching method and system which can stop recommending of a category with respect to a query including a keyword, which is set as a prohibited word, and thereby can control a product, which is against public mores or inappropriate for characteristics of a product relay server, to be not sold.

Also, according to one embodiment of the present invention, there is provided an automatic matching method and system which can create a query associated with an external identifier, and recommend an internal category, highly related to the created query, as a category corresponding to the external identifier, and thereby effectively match an appropriate category and the external identifier.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of building a commodity list for use in searching commodities available for sale on the Internet, comprising:
   providing a commodity list comprising names of commodities;
   providing an undesirable word list comprising undesirable words to use in identifying commodities;
   receiving, from a remote terminal, a proposed phrase for identifying a particular product or service available for sale on the Internet, the proposed phase comprising a first term and a second term that are separated by a space therebetween;
   determining whether the commodity list includes the proposed phrase as a whole;
   if determined that the commodity list does not include the proposed phrase as a whole, then determining whether the commodity list includes the first term as a whole or the second term as a whole;
   if determined that the commodity list includes neither the first term as a whole nor the second term as a whole, then determining whether the first term incorporates one or more undesirable words of the undesirable word list;
   if determined that the first term incorporates an undesirable word therein, then removing the undesirable word from the first term so as to create a modified first term excluding the undesirable word;
   determining whether the commodity list includes the modified first term as a whole; and
   linking the particular product or service to the modified first term in the commodity list such that the particular product or service is searchable in the commodity list using the modified first term.

2. The method of claim 1, wherein if determined that the commodity list includes the modified first term as a whole, then the method further comprises determining the modified first term as a desirable identification for the product or service.

3. The method of claim 2, further comprising:
transmitting, to the remote terminal, the desirable identification of the product or service.

4. The method of claim 3, further comprising:
receiving, from the remote terminal, a bid for using the desirable identification for a computerized advertisement service, wherein the computerized advertisement service involves displaying a link to a website for selling the product or service in reply to a computerized search request using the desirable identification.

5. The method of claim 1, wherein if determined that the commodity list does not include the modified first term as a whole, then the method further comprises determining whether the modified first term incorporates any of the names of commodities of the commodity list.

6. The method of claim 5, wherein if determined that the modified first term incorporates two or more names of commodities therein, then the method further comprises transmitting, to the remote terminal, the two or more names of commodities as desirable identifications for the product or service, wherein within the modified first term, the two or more names are not separated by a space therebetween.

7. The method of claim 5, wherein if determined that the modified first term incorporates two or more names of commodities therein, then the method further comprises transmitting, to the remote terminal, the two or more names of commodities as desirable identifications for the product or service, wherein within the modified first term, the two or more names are separated by a space therebetween.

8. The method of claim 1, wherein the undesirable word is selected from the group consisting of a word, an expression and a string of letters that describe a quality, quantity, price or aesthetic of the product or service.

* * * * *